US008670327B2

(12) United States Patent
Yoshida et al.

(10) Patent No.: US 8,670,327 B2
(45) Date of Patent: Mar. 11, 2014

(54) RELAY DEVICE

(75) Inventors: Atsushi Yoshida, Osaka (JP); Takao Yamaguchi, Osaka (JP); Tomoki Ishii, Kyoto (JP)

(73) Assignee: Panasonic Corporation, Osaka (JP)

( * ) Notice: Subject to any disclaimer, the term of this patent is extended or adjusted under 35 U.S.C. 154(b) by 166 days.

(21) Appl. No.: 13/227,740

(22) Filed: Sep. 8, 2011

(65) Prior Publication Data

US 2012/0057467 A1    Mar. 8, 2012

Related U.S. Application Data

(63) Continuation of application No. PCT/JP2011/000034, filed on Jan. 7, 2011.

(30) Foreign Application Priority Data

Mar. 5, 2010 (JP) .................................. 2010-049108

(51) Int. Cl.
*H04L 12/407* (2006.01)

(52) U.S. Cl.
USPC ............................. 370/238; 370/235; 370/236

(58) Field of Classification Search
None
See application file for complete search history.

(56) References Cited

U.S. PATENT DOCUMENTS

| 5,638,359 | A | * | 6/1997 | Peltola et al. | 370/229 |
| 5,748,629 | A | * | 5/1998 | Caldara et al. | 370/389 |
| 5,757,771 | A | * | 5/1998 | Li et al. | 370/235 |
| 5,774,454 | A | * | 6/1998 | Kim et al. | 370/232 |
| 6,721,273 | B1 | * | 4/2004 | Lyon | 370/235 |
| 6,813,673 | B2 | * | 11/2004 | Kotlowski et al. | 710/305 |
| 7,966,419 | B2 | * | 6/2011 | Mosko et al. | 709/238 |
| 8,005,097 | B2 | * | 8/2011 | Thid et al. | 370/400 |
| 2002/0146013 | A1 | * | 10/2002 | Karlsson et al. | 370/395.6 |

(Continued)

FOREIGN PATENT DOCUMENTS

| JP | 2004-078713 A | | 3/2004 | | |
| JP | 2004078713 A | * | 3/2004 | ............ | G06F 15/173 |

(Continued)

OTHER PUBLICATIONS

Chakchai So-In et al, "Enhanced Forward Explicit Congestion Notification (E-FECN) scheme for datacenter Ethernet networks", pp. 542-546, Jun. 18, 2008.*

(Continued)

*Primary Examiner* — Andrew Lai
*Assistant Examiner* — Mario Malcolm
(74) *Attorney, Agent, or Firm* — Renner, Otto, Boisselle & Sklar, LLP

(57) ABSTRACT

A relay device includes a switch for switching a combination of an input for receiving traffic data and an output for sending the traffic data; a congestion information processing section for obtaining congestion information indicating a degree of congestion of each of a plurality of traffics from an adjacent relay device, and congestion information of each traffic in the relay device; a congestion information comparison section for finding information on a congestion level which quantitatively indicates difficulty of flowing of each traffic on a transmission route based on the congestion information obtained from the adjacent relay device and the congestion information of the relay device; a transmission scheduling adjustment section for assigning a transmission band of a bus to each traffic based on the congestion level; and a switch assignment section for shifting the switch based on a result of the assignment of the transmission band of the bus.

12 Claims, 30 Drawing Sheets

(56) References Cited

U.S. PATENT DOCUMENTS

| | | |
|---|---|---|
| 2005/0157750 A1* | 7/2005 | Rabie et al. .................. 370/466 |
| 2008/0084893 A1 | 4/2008 | Lee |
| 2008/0186991 A1 | 8/2008 | Thid et al. |
| 2011/0103246 A1* | 5/2011 | Byun ........................... 370/252 |

FOREIGN PATENT DOCUMENTS

| | | | |
|---|---|---|---|
| JP | 2007-251777 A | 9/2007 | |
| JP | 2008109213 | * 5/2008 | ............. H04L 12/56 |
| JP | 2008541647 T | 11/2008 | |

OTHER PUBLICATIONS

International Search Report for corresponding International Application No. PCT/JP2011/000034 mailed Mar. 8, 2011.

Form PCT/ISA/237 for corresponding International Application No. PCT/JP2011/000034 dated Mar. 8, 2011.

\* cited by examiner

US 8,670,327 B2

RELAY DEVICE

This is a continuation of International Application No. PCT/JP2011/000034, with an international filing date of Jan. 7, 2011, which claims priority of Japanese Patent Application No. 2010-049108, filed on Mar. 5, 2010, the contents of which are hereby incorporated by reference.

BACKGROUND OF THE INVENTION

1. Field of the Invention

The present invention relates to a technology for, in a semiconductor integrated circuit including decentralized buses, adjusting transmission scheduling of a plurality of traffics flowing between a plurality of relay devices for connecting the buses.

2. Description of the Related Art

FIG. 1A shows an example of control made on centralized buses. In a conventional integrated circuit for performing control on centralized buses, each of a plurality of bus masters and a memory are connected to each other mainly by one bus, and an arbiter arbitrates an access from each bus master to the memory. However, integrated circuits now have improved functions and multiple cores, and so the scale of the circuits is enlarged and traffics flow on the buses while changing in a complicated manner. For these reasons, it has become difficult to design an integrated circuit in which centralized buses are controlled.

In the meantime, development of integrated circuits having decentralized buses have progressed through incorporation of connection technologies by parallel computers and technologies of network control. FIG. 1B shows an example of control made on decentralized buses. A semiconductor integrated circuit having decentralized buses includes a plurality of relay devices which are connected to each other via a plurality of buses. Recently, it has been attempted to use the decentralized buses as shown in FIG. 1A to provide a network on chip for transmitting traffics in a large scale integrated circuit while decentralizing the traffics into a plurality of buses.

However, such decentralized buses do not allow transmission scheduling to be arbitrated among bus masters which are separated from each other by the relay devices.

Therefore, interference occurs when a certain number of traffics join together at a relay device or when the flow rate of the traffics changes. As a result, the transmission quality is lowered; for example, the delay time or jitter is increased or the throughput is decreased.

According to a conventionally known technology for avoiding the reduction of the transmission quality of the traffics flowing in decentralized buses, the transmission scheduling of each traffic is adjusted by the relay devices, so that the interference among the traffics at the relay devices is suppressed (see, for example, Japanese Laid-Open Patent Publication No. 2008-541647).

FIG. 2 shows a structure of the conventional relay devices for controlling the transmission scheduling and transmission routes of traffics A through C described in Japanese Laid-Open Patent Publication No. 2008-541647. The traffic A is transmitted from a bus master A to a memory D via a relay device E and a relay device F. The traffic B is transmitted from a bus master B to the memory D via the relay device E and the relay device F. The traffic C is transmitted from a bus master C to the memory D via the relay device F.

The relay devices shown in FIG. 2 each include a plurality of transmission buffers. Data packets transmitted from the bus masters A through C are each provided with information which specifies of which traffic the data packet is.

Upon receiving a data packet, each relay device classifies the data packet by traffic and stores the data packet in a buffer for the corresponding traffic. The relay device transmits the data packets in each buffer to the next relay device such that the transmission quality (delay time and throughput) is equal among the traffics. This processing is referred to as the "scheduling adjustment processing".

In the example of FIG. 2, the relay device E, at which the traffic A and the traffic B join together, adjusts the transmission scheduling such that the band is assigned to the traffic A and the traffic B equally, namely, 50% of the band is assigned to each of the traffics A and B, before relaying the traffics to the relay device F. Similarly, the relay device F, at which the traffic A, the traffic B and the traffic C join together, adjusts the transmission scheduling such that 33% of the band is assigned to each of the traffics.

In this manner, the transmission band is assigned equally to each of the traffics transmitted from the three bus masters to the memory D. Therefore, the reduction of the transmission performance due to the interference among the traffics can be suppressed.

In a conventional relay device, each relay device adjusts the transmitter scheduling based only on the states of the traffics passing the relay device, and thus controls the traffics such that the transmitter performance is equal locally. In other words, each relay device adjusts the transmission scheduling independently and selfishly. With such control, when traffics flowing in the circuit have certain conditions, for example, when a traffic has a higher priority degree than other traffics, competition is caused among the traffics by the adjustment of transmission scheduling performed by each relay device. This may rather decrease, than increase, the transmission performance (delay time and throughput) of the entire circuit.

Hereinafter, this problem will be described more specifically.

FIG. 3 shows the traffics A through C when competition occurs among the traffics.

In FIG. 3, the bus master A transmits the traffic A to a memory G via the relay device E and the relay device F. The bus master B transmits the traffic B to the memory D via the relay device E and the relay device F. The bus master C transmits the traffic C to the memory D via the relay device F.

Also in FIG. 3, it is assumed that the traffic C is transmitted at the time of emergency and so has a relatively high priority degree. The relay device F assigns the entire transmission band (100%) of the bus to the memory D to the traffic C with priority. As a result, no band of the bus to the memory D is assigned to the traffic B.

When each of the relay device E and the relay device F adjusts the transmission scheduling in a conventional manner, namely, based only on the states of traffics passing the respective relay device, the relay device E assigns 50% of the transmission band equally to each of the traffic A and the traffic B although the traffic F, to which the traffic B is to be transmitted, assigns no band of the bus to the traffic B. This means that from the viewpoint of the entire circuit, the transmission scheduling control performed by the relay device E rather decreases, than increases, the utilization efficiency of the bus from the relay device E to the relay device F.

SUMMARY OF THE INVENTION

The present invention, made to solve the above-described problem, has an object of controlling the flow rate of traffics at relay devices so as to suppress the increase of the delay time and jitter, the decrease of the throughput, and the like of the entire circuit.

A relay device according to the present invention is a relay device for, in an integrated circuit including decentralized buses, connecting the plurality of buses. The relay device includes a switch for switching a combination of an input for receiving traffic data and an output for sending the traffic data; a congestion information processing section for obtaining congestion information indicating a degree of congestion of each of a plurality of traffics from an adjacent relay device which handles the plurality of traffics commonly with the relay device, and congestion information of each traffic in the relay device; a congestion information comparison section for finding information on a congestion level which quantitatively indicates difficulty of flowing of each traffic on a transmission route based on the congestion information obtained from the adjacent relay device and the congestion information of the relay device; a transmission scheduling adjustment section for assigning a transmission band of the bus to each traffic based on the congestion level to adjust transmission scheduling; and a switch allocation section for shifting the switch based on a result of the assignment of the transmission band of the bus.

The congestion information may indicate a delay time required by traffic data of each traffic to pass the relay device; and the congestion information comparison section may find information on the congestion level which quantitatively indicates the difficulty of flowing of each traffic on the transmission route based on the delay time of each traffic obtained from the adjacent relay device and the delay time of each traffic at the relay device.

The congestion level may be a numerical value which indicates the difficulty of flowing of each traffic on the transmission route, and may be lower as the traffic flows more easily and may be higher as the traffic has more difficulty flowing; and the transmission scheduling adjustment section may assign the transmission band of the bus to a traffic having a relatively low congestion level with priority.

The transmission scheduling adjustment section may assign the transmission band of the bus to a traffic having a relatively low congestion level with priority by securing a relatively wide part of the transmission band of the bus for the traffic, by allowing the traffic to use the transmission band of the bus first, or by securing a relatively long time in which the traffic can use the transmission band of the bus.

The traffic data of each traffic may be transmitted on the buses as being divided into packets; and the relay device may further include a packet disposal section for disposing of a packet of a traffic, having a congestion level higher than a prescribed threshold level, from the input buffer; and a re-transmission request section for requesting a buffer which is a transmitting end of the disposed packet to re-transmit the packet.

The traffic data of each traffic may be transmitted on the buses as being divided into packets; and the relay device may further include a plurality of output buffers respectively connected to a plurality of outputs for sending data to different buses; and a routing reuse notification section for allocating an identical output buffer to continuous packets of a traffic having a congestion level higher than a prescribed threshold level, and notifying a relay device to which the traffic is to be transmitted that routing setting is to be reused.

An operation clock of each of the buses may be changeable; and the relay device may further include an operation clock control section for increasing an operation clock of the bus connected to the output when a traffic having a congestion level higher than a prescribed threshold level is to be transmitted.

The relay device may further include a cooperative control stop section for, when a delay time exceeding a prescribed threshold level occurs at the relay device, determining a congestion level based only on the delay time required by the traffic data to pass the relay device.

Another relay device according to the present invention is a relay device for, in an integrated circuit including decentralized buses, connecting the plurality of buses. The relay device includes a switch for switching a combination of an input for receiving traffic data and an output for sending the traffic data; a congestion information processing section for obtaining congestion information indicating a degree of congestion of each of a plurality of traffics from an adjacent relay device which handles the plurality of traffics commonly with the relay device, and congestion information of each traffic in the relay device; a congestion information comparison section for finding information on a congestion level which quantitatively indicates difficulty of flowing of each traffic on a transmission route based on the congestion information obtained from the adjacent relay device and the congestion information of the relay device; a transmission scheduling adjustment section for, where the congestion level of each traffic is a congestion level of an input buffer accumulating traffic data of the traffic, determining a value of weight of an output buffer accumulating the traffic data in accordance with the congestion level of the input buffer and assigning a transmission band of the bus for each traffic in accordance with the determined value of weight to adjust transmission scheduling; and a switch allocation section for shifting the switch based on a result of the assignment of the transmission band of the bus.

The transmission scheduling adjustment section may connect the switch to the input buffer which received a transmission request at a probability in accordance with the value of weight given to each output buffer.

The transmission scheduling adjustment section may divide the transmission band by time into a plurality of time slots and assign the time slots of a number specified in accordance with the value of weight to each of the output buffers.

The transmission scheduling adjustment section may stochastically select an output buffer at a ratio specified in advance in accordance with the value of weight.

According to a relay device of the present invention, information on the congestion level which quantitatively indicates the difficulty of flowing of each traffic on the transmission route is found based on the congestion information obtained from an adjacent relay device and the congestion information of the relay device of interest. Based on the congestion level, the transmission band of the bus is assigned to each traffic and thus transmission scheduling is adjusted. Owing to this, the reduction of the transmission quality (delay time, throughput, etc.) caused by the interference among the traffics on the transmission route can be suppressed. The utilization factor of the entirety of the decentralized buses is improved, and thus the improvement of the transmission performance (short delay, high throughput) of the entire integrated circuit can be realized.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Before describing each of embodiments according to the present invention, the principle of operation of a relay device according to the present invention will be first described.

Figure 4:
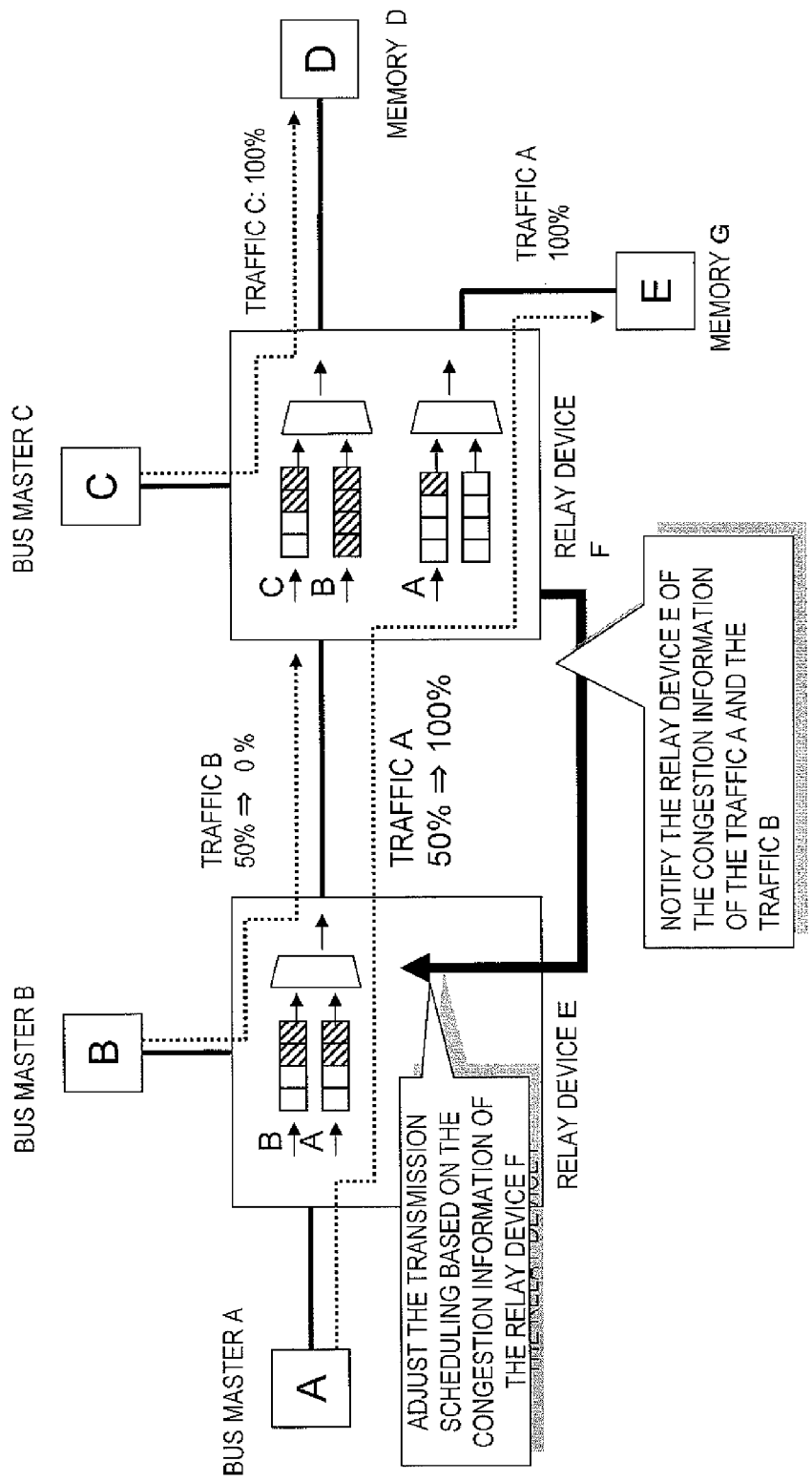
FIG. 4 shows an overview of operation of a relay device according to the present invention.

FIG. 4 shows an overview of operation of a relay device according to the present invention.

Figure 1B:
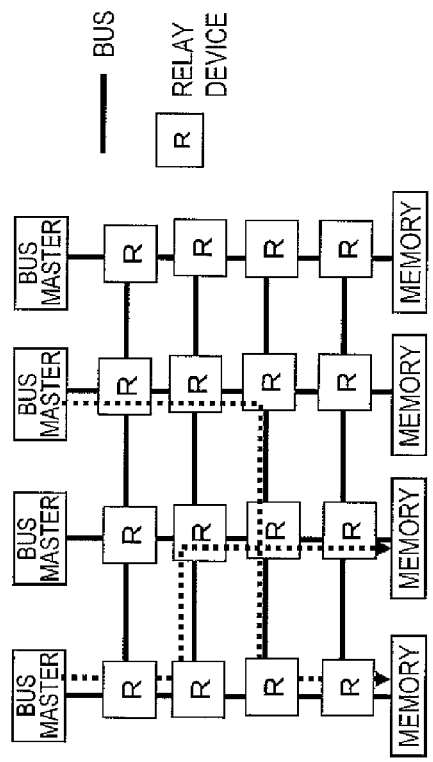
FIG. 1B shows an example of control made on decentralized buses.
Figure 1A:
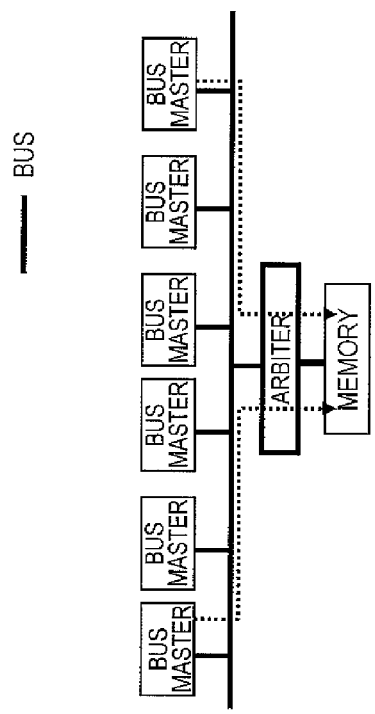
FIG. 1A shows an example of control made on centralized buses.
Figure 2:
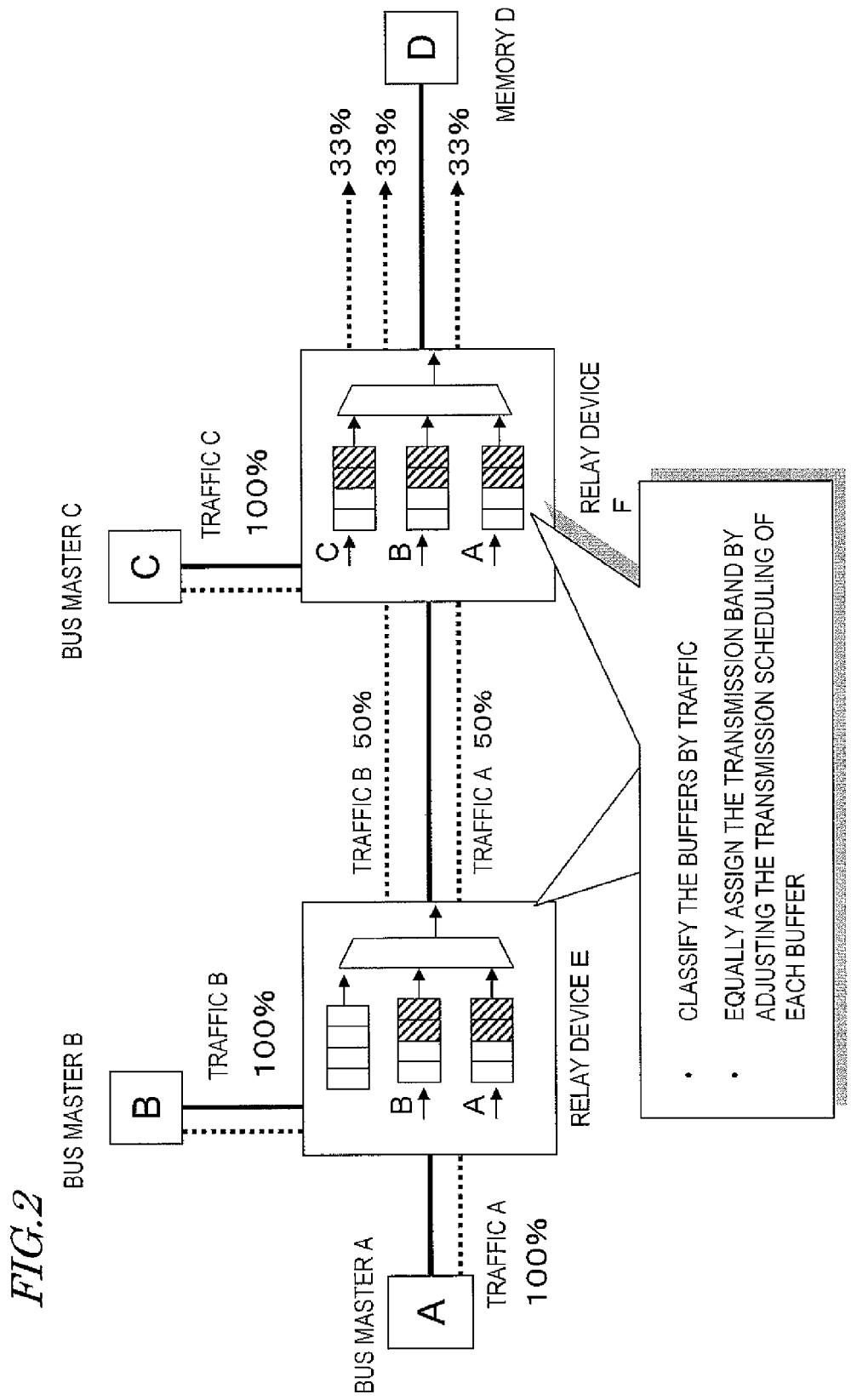
FIG. 2 shows a structure of a conventional relay device for controlling transmission scheduling and transmission routes of traffics A through C described in Japanese Laid-Open Patent Publication No. 2008-541647.
Figure 3:
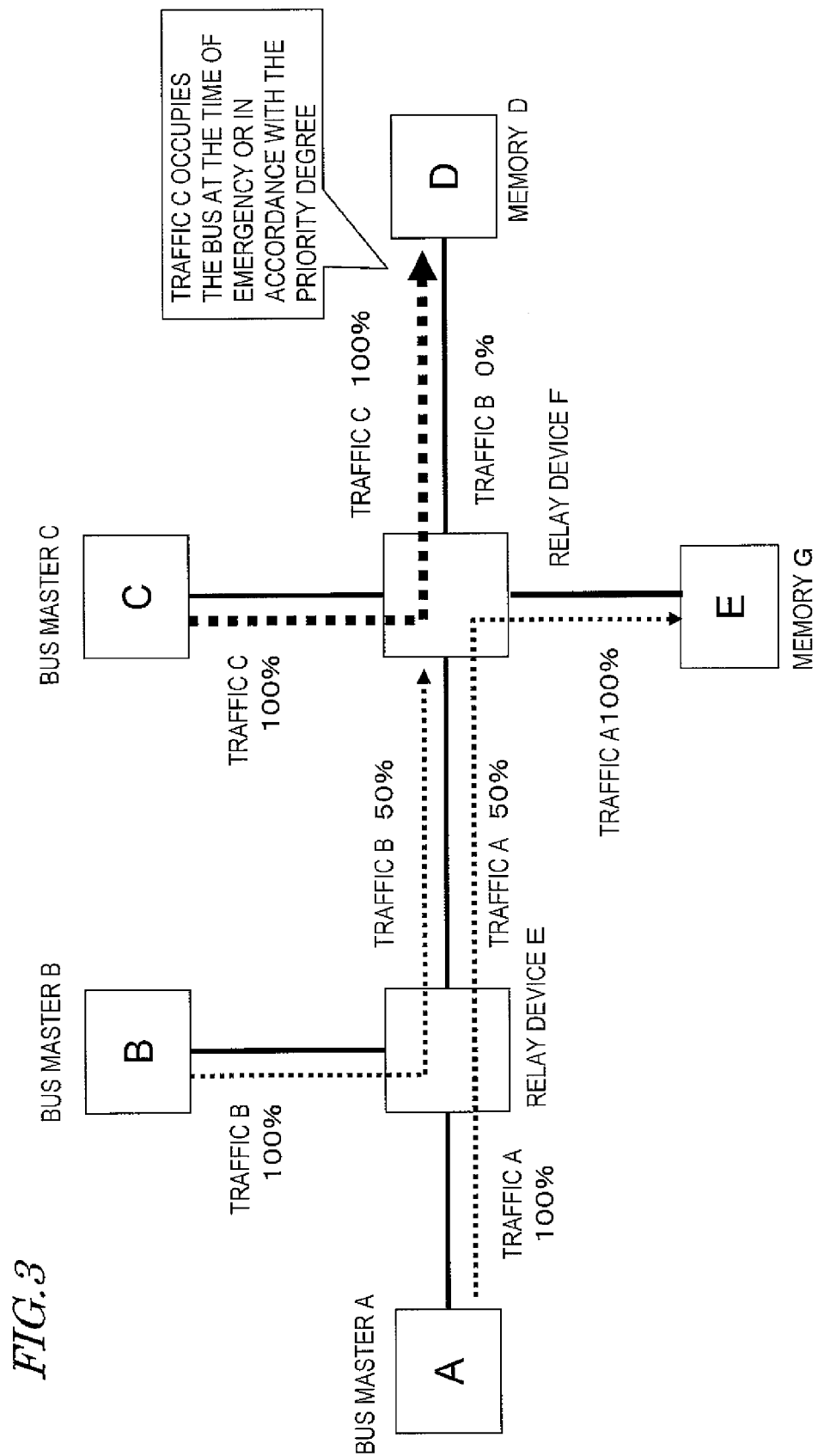
FIG. 3 shows the traffics A through C when competition occurs among the traffics.

In FIG. 4, like in FIG. 3, it is assumed that a bus master A transmits a traffic A to a memory G via a relay device E and a relay device F, that a bus master B transmits traffic B to a memory D via the relay device E and the relay device F, and that a bus master C transmits traffic C to the memory D via the relay device F.

The relay device E according to the present invention transmits the traffic A and the traffic B to the relay device F. For determining the transmission band of each of the traffic A and the traffic B, the relay device E issues a request to the adjacent relay device F and has the relay device F notify a value which quantitatively indicates the difficulty of flowing of a data packet of each of the traffic A and the traffic B at the relay device F. In the embodiments described below, this value will be referred to as the "congestion information". In this specification, the time period required by the data packet of each traffic to pass the relay device (hereinafter, this time period will be referred to as the "delay time" of each traffic) will be used as the congestion information.

Upon receiving the congestion information from the relay device F, the relay device E compares the delay time at the relay device E and the delay time at the adjacent relay device F regarding each traffic. Thus, the relay device E finds, by calculation, information which quantitatively indicates the difficulty of flowing of the data packet of each traffic on the route. In this specification, this information will also be referred to as the "congestion level". Upon finding the congestion level of each traffic, the relay device E adjusts the transmission scheduling of each traffic such that the transmission band of the bus to the relay device F is assigned to each traffic based on the value of the congestion level.

In FIG. 4, it is assumed that the prioritized traffic C for emergency is transmitted from the bus master C to the memory D. In this case, the relay device F causes the transmission band of the bus from the relay device F to the memory D to be temporarily occupied by the traffic C. Since the prioritized traffic C for emergency is generated, the data packet of the traffic B cannot be transmitted to the memory D. Therefore, the delay time of the traffic B at the relay device F is extended.

The relay device F notifies the relay device E of the delay time of each of the traffic A and the traffic B as the congestion information of the relay device F. The relay device E compares the delay time notified by the relay device F and the delay time at the relay device E. As a result, the relay device E can specify that the data packet of the traffic B has more difficulty flowing than the data packet of the traffic A in the relay device F. Thus, the relay device E adjusts the transmission scheduling such that the transmission band of the bus to the relay device F which is assigned to the traffic A is increased from 50% to 100%, namely, the transmission band is assigned to the traffic A with priority. The relay device E adjusts the transmission scheduling such that the transmission band of the bus to the relay device F which is assigned to the traffic B is decreased from 50% to 0%.

In this specification, the expression "assign with priority" used regarding the transmission band of the bus is not limited to meaning that a relatively wide part of the transmission band is secured as described above. This expression may also mean that the transmission band of the bus is opened so that a certain traffic can use the transmission band first and is transmitted before the other traffics, or may mean that the time period in which the transmission band is usable by a certain traffic (permitted time) is kept relatively long.

The present invention has been made by tackling the issue of how to control the flow of traffics with a low priority degree or with no priority degree while transmitting, with priority, a traffic with a high priority degree.

Hereinafter, relay devices in embodiments according to the present invention will be described with reference to the attached drawings.

Embodiment 1

Figure 5:
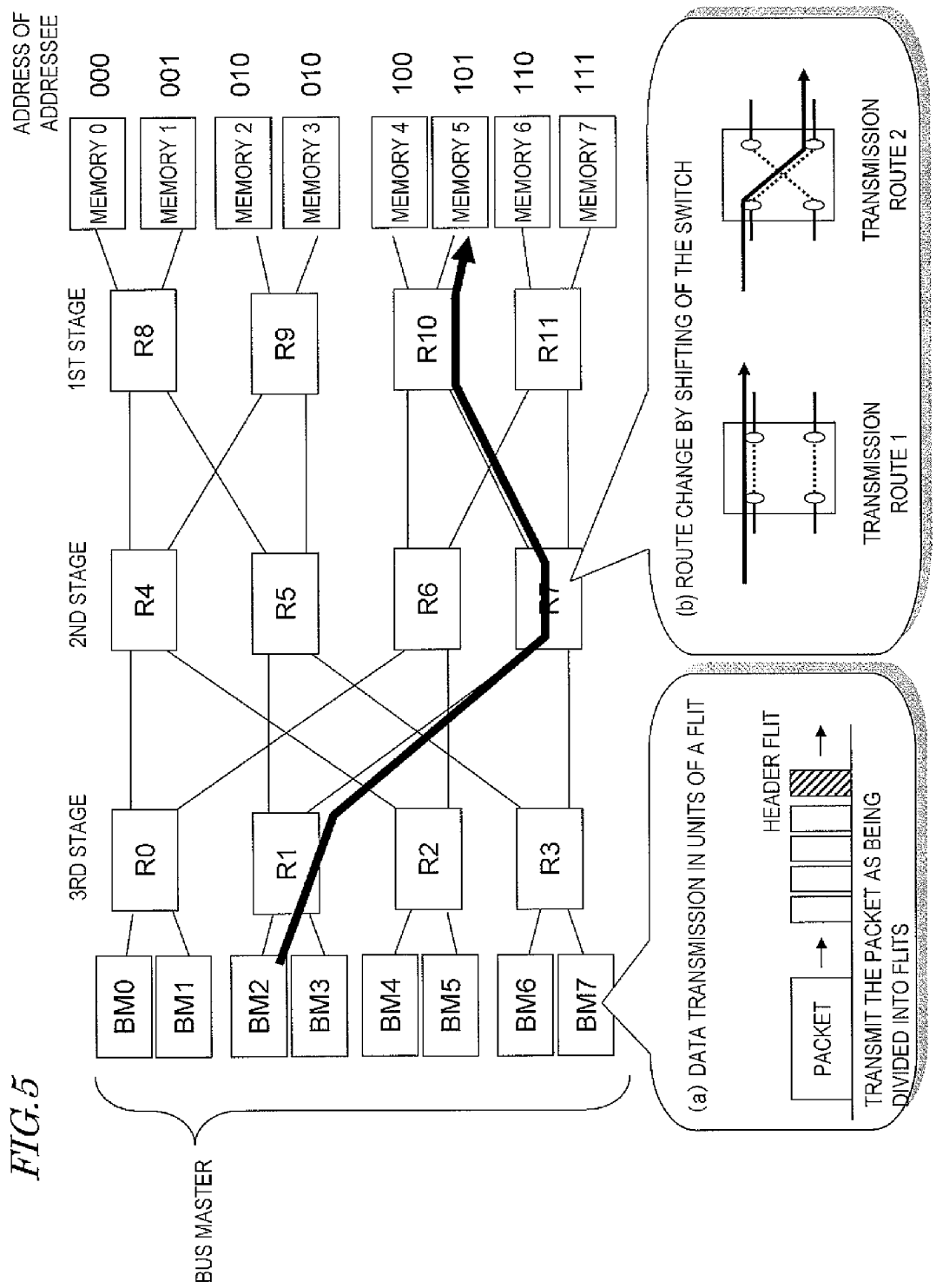
FIG. 5 is a structural view of decentralized buses in Embodiment 1.

FIG. 5 is a structural view of decentralized buses in this embodiment.

In this embodiment, a structure in which a plurality of bus masters (BM) and a plurality of memories are connected by a plurality of relay devices in multiple stages via buses (MIN: Multistage Interconnection. Network) will be described as an example.

FIG. 5 shows a circuit in which eight bus masters (BM0 through BM7), 12 relay devices (R0 through R11), and eight memories (memory 0 through memory 7) are connected by buses. The 12 relay devices are divided into three groups each including four relay devices. The three groups are: a group (R0, R1, R2, R3) connected to the eight bus masters, a group (R8, R9, R10, R11) connected to the eight memories, and a group (R4, R5, R6, R7) for connecting the relay devices connected to the bus masters and the relay devices connected to the memories.

Each of the relay devices included in the multistage interconnection network includes a cross bar switch of two inputs and two outputs. As shown in (b) of FIG. 5, the input/output combination is changed by shifting of the switch, and thus the traffic flow can be changed between two transmission routes. As long as the transmission routes to which traffics are to be output are different, each relay device can output such two traffics at the same time to such different transmission routes.

In the multistage interconnection network, at least one transmission route can be constructed between each of all the bus masters and each of all the memories without fail by shifting of the switch at each relay device.

In general, in order to connect all the N pieces of bus masters and all the M pieces of memories by cross bar switches, N×M pieces of switches are necessary. As the number of the bus masters and the memories is increased, the number of the switches is drastically increased. By contrast, the multistage interconnection network (MIN) has a feature of capable of switching the connection between the bus masters and the memories with a smaller number of switches by connecting the cross bar switches having a small number of inputs and outputs in a hierarchical manner.

In this embodiment, the multistage interconnection network is described, but this is merely an example. The present invention is applicable to integrated circuits having other topologies. In this embodiment, it is assumed that data transfer from a bus master to a memory is performed via a plurality of relay devices by a packet switching system.

As shown in (a) of FIG. 5, a packet is transmitted to an adjacent relay device as being divided into sizes called "flits".

Figure 6:
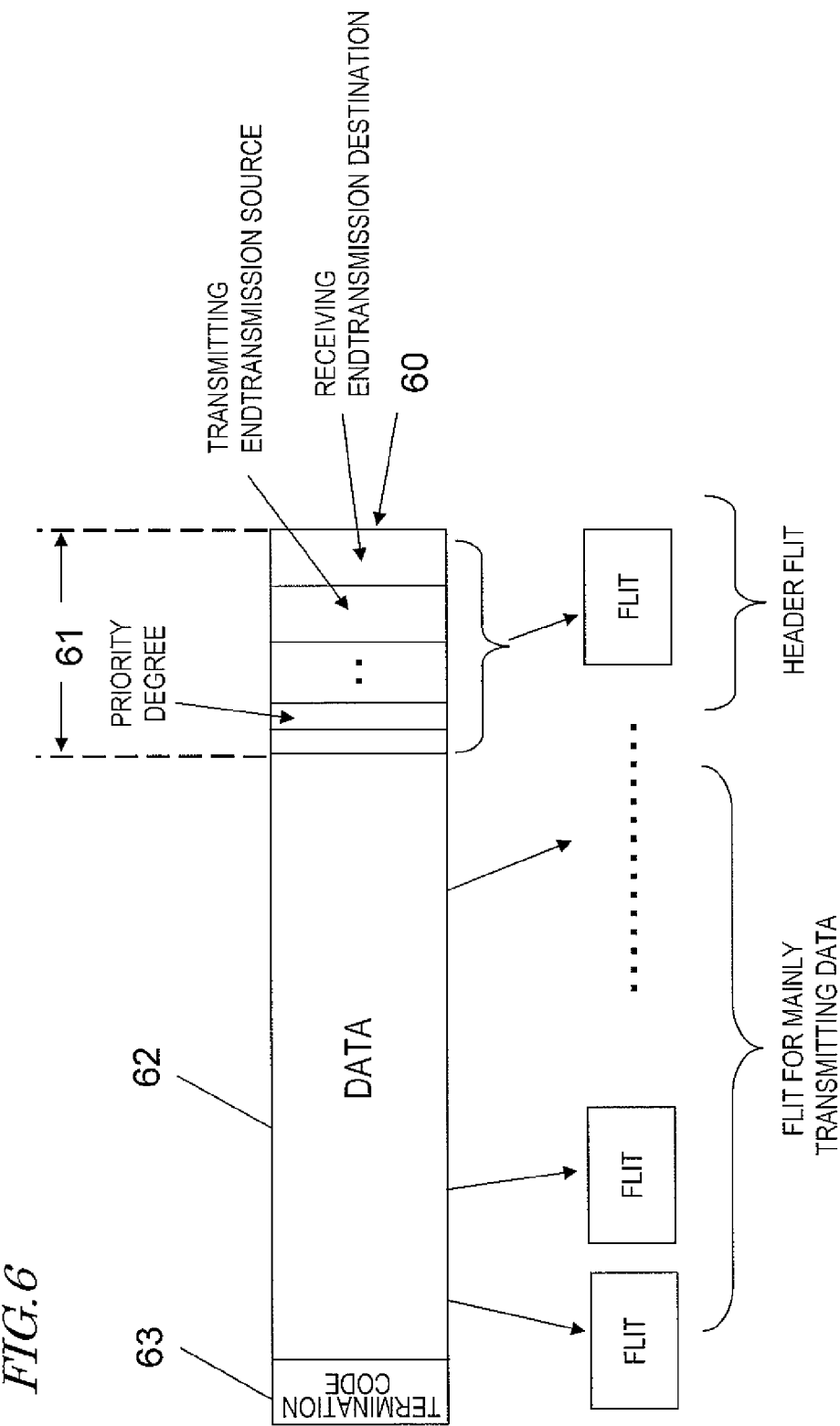
FIG. 6 shows an example of transmission format of a packet 60 and an example in which the packet 60 is divided into a plurality of flits.

FIG. 6 shows an example of transmission format of a packet 60 and an example in which the packet 60 is divided into a plurality of flits.

The packet 60 includes a header field 61, a data field 62 and a control code field 63.

In the header field 61, for example, information indicating an address of the receiving end, an address of the transmitting end and the priority degree of the traffic is described. The method of describing the priority degree is optional but may be represented with multi-values. When the priority degree is described with multi-values, processing on the user interface requiring a high responsiveness can be assigned a high numerical value so that the priority degree is set high. By contrast, transcode processing on a video, which can be performed by background processing, can be assigned a low numerical value so that the priority degree is set low. After such information, the data to be transmitted is described.

In the data field 62, for example, video data or audio data is described. In the control code field 63, for example, a predefined termination code of the packet 60 is described.

Based on the address of the receiving end and the address of the transmitting end, among the data in the header field 61, the relay processing and the receiving processing on a receiving side are performed on the packet 60.

The bus master on the transmission side transmits the packet 60 in a state of being divided into small packet units called "flits". One flit is data which can be transmitted in one cycle using the bus, and the size thereof is determined based on the width of the bus. Among the flits obtained by division of the packet 60, the flit first transmitted is called a "header flit". In the header flit, flag information indicating that the flit is the leading end of the packet and address information of the receiving end of the packet are provided.

The flits following the header flit do not store the address information specifying the receiving end. A reason for this is that the flits following the header flit is sent to the same addressee as the header flit. Once the addressee is determined by the header flit and the output buffer for outputting the header flit of the traffic is determined, the following flits are transmitted to the addressee indicated by the header flit via the same output buffer as the header flit.

Upon detecting the termination code described in the control code field 63, the memory on the receiving side re-constructs the transmitted flits into a packet based on the termination code.

For example, the size of 1 packet is 128 bytes, and the size of 1 flit is 32 bits or 64 bits. It should be noted that the size of 1 packet and the size of 1 flit may vary in accordance with the application, and so each of the above-mentioned sizes is merely an example. The length of the flit may be determined based on the length by which the control data can be described, for example, the address of the receiving end, the address of the transmitting end of the like.

Each relay device includes a buffer for accumulating the flits sent thereto. Each flit is, after being once accumulated in the buffer, is transmitted to a relay device on the route to the destination or the memory of the addressee by shifting of the switch.

Figure 7:
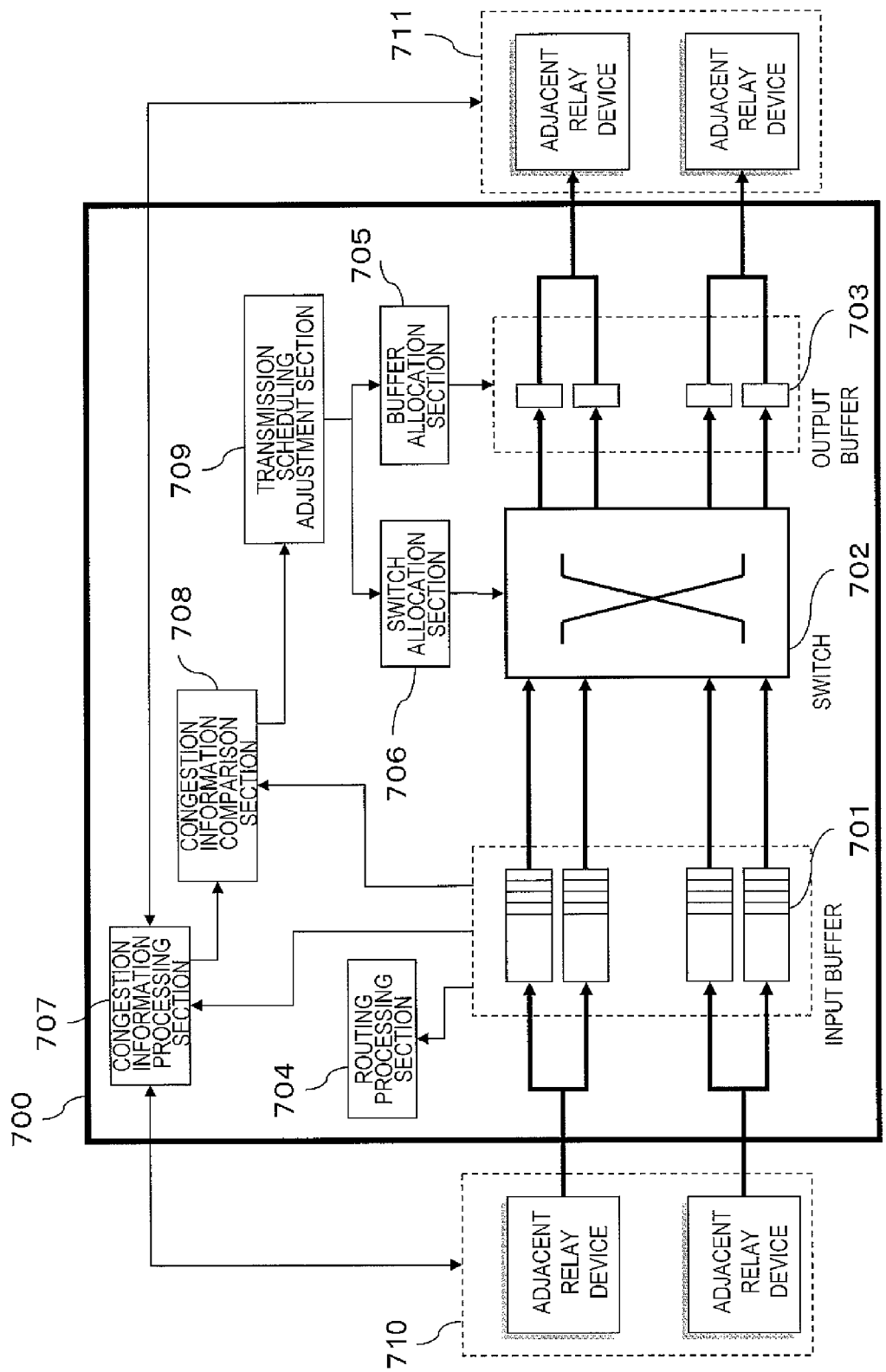
FIG. 7 is a structural view of a relay device 700 in Embodiment 1.

FIG. 7 is a structural view of a relay device 700 in this embodiment.

The relay device 700 in FIG. 7 is connected to a group of adjacent relay devices 710 and a group of adjacent relay devices 711 via buses, and controls the transmission scheduling of flits by shifting the switch in order to relay the flits transmitted from the group of adjacent relay devices 710 to the group of adjacent relay devices 711 located on the route to the correct addressee.

The relay device 700 includes input buffers 701, a switch 702, output buffers 703, a routing processing section 704, a buffer allocation section 705, a switch allocation section 706, a congestion information processing section 707, a congestion information comparison section 708, and a transmission scheduling adjustment section 709.

Hereinafter, the functions of each of the elements will be described.

The input buffers 701 are each a temporary buffer for accumulating a flit sent from an adjacent relay device (or a bus master). One temporary buffer acting as the input buffer 701 may be provided for each input of the relay device 700. Alternatively, a plurality of temporary buffers may be provided for each input so that packets for each addressee are accumulated in one temporary buffer and transmission scheduling can be controlled for the packets of each addressee. In this embodiment, as shown in FIG. 7, two input buffers are provided for each input.

The switch 702 is a cross bar switch for switching the input/output connection combination of the relay device 700.

The output buffers 703 are each a temporary buffer used for transmitting a flit to an adjacent relay device 711. The output buffers 703 are provided by the same number as that of input buffers of the adjacent relay devices 711. Each of the output buffers of the relay device 700 and each of the input buffers of the relay devices 711 have a determined one-to-one correspondence. A flit transmitted from each output buffer of the relay device 700 is accumulated in the input buffer of the adjacent relay device 711 corresponding to the output buffer 703. Accordingly, the relay device 700 can specify the input buffer of the adjacent relay device 711 by selecting the output buffer to be used for transmitting the flit.

When a new header flit is sent to one of the input buffers 701, the routing processing section 704 receives the new header flit and specifies the relay device to which the new header flit is to be forwarded based on the addressee information described in the header flit.

The buffer allocation section 705 allocates a dedicated output buffer to which the flit is to be transmitted, to the input buffer in which the flit is accumulated, so that the flit is relayed to an appropriate route.

When the header flit arrives at one of the input buffers, the buffer allocation section 705 selects one output buffer which is not in use at this point among the output buffers 703 connected to the transmission routes specified by the routing processing section 704, and thus allocates the one output buffer 703 as the dedicated output buffer for transmitting the flit.

The buffer allocation section 705 maintains the input buffer/output buffer combinations until the entirety of one packet goes out of the relay device.

The switch allocation section 706 determines an input buffer/output buffer combination for actually transmitting the flit to the adjacent relay device 711 among the combinations of the input buffers 701 and the output buffers 703 determined by the buffer allocation section 705. Then, the switch allocation section 706 shifts the switch 702 to connect the determined input buffer 701 and output buffer 703.

The congestion information processing section 707 issues a request to the nearby relay device 710 or 711 which handles a plurality of traffics commonly with the relay device 700, and obtains congestion information indicating the degree of congestion of each traffic. When receiving a request to issue congestion information from the nearby relay device 710 or 711, the congestion information processing section 707 measures and thus obtains congestion information which quantitatively indicates the difficulty of flowing of the data packet of each traffic on each transmission route, and outputs the obtained congestion information to the relay device.

As the congestion information, for example, a measured value of the delay time required until the data packet goes out of the relay device is used.

As the data packet has more difficulty flowing on the transmission route, the flit has more difficulty being transmitted from the relay device 700 to the bus, and so the delay time of the data packet is extended. Therefore, based on the delay time, the difficulty of flowing of the data packet on each transmission route can be quantitatively specified.

The congestion information comparison section 708 compares the congestion information of each traffic notified from the nearby relay device 710 or 711 and the congestion information of each traffic at the relay device 700 which is defined by the receiving end described in the header, and calculates the congestion level which quantitatively indicates the difficulty of flowing of each traffic on the route.

The transmission scheduling adjustment section 709 adjusts the assignment of the transmission band of the bus to each traffic based on the congestion level found by the congestion information comparison section 708.

The adjustment of the assignment of the transmission band performed by the relay device 700 includes the adjustment of scheduling on how the buffer allocation section 705 is to allocate the output buffers 703 which are temporary buffers, and the adjustment of scheduling on how the switch allocation section 706 is to shift the switch 702.

Now, an operation of relay device 700 will be described.

Figure 8:
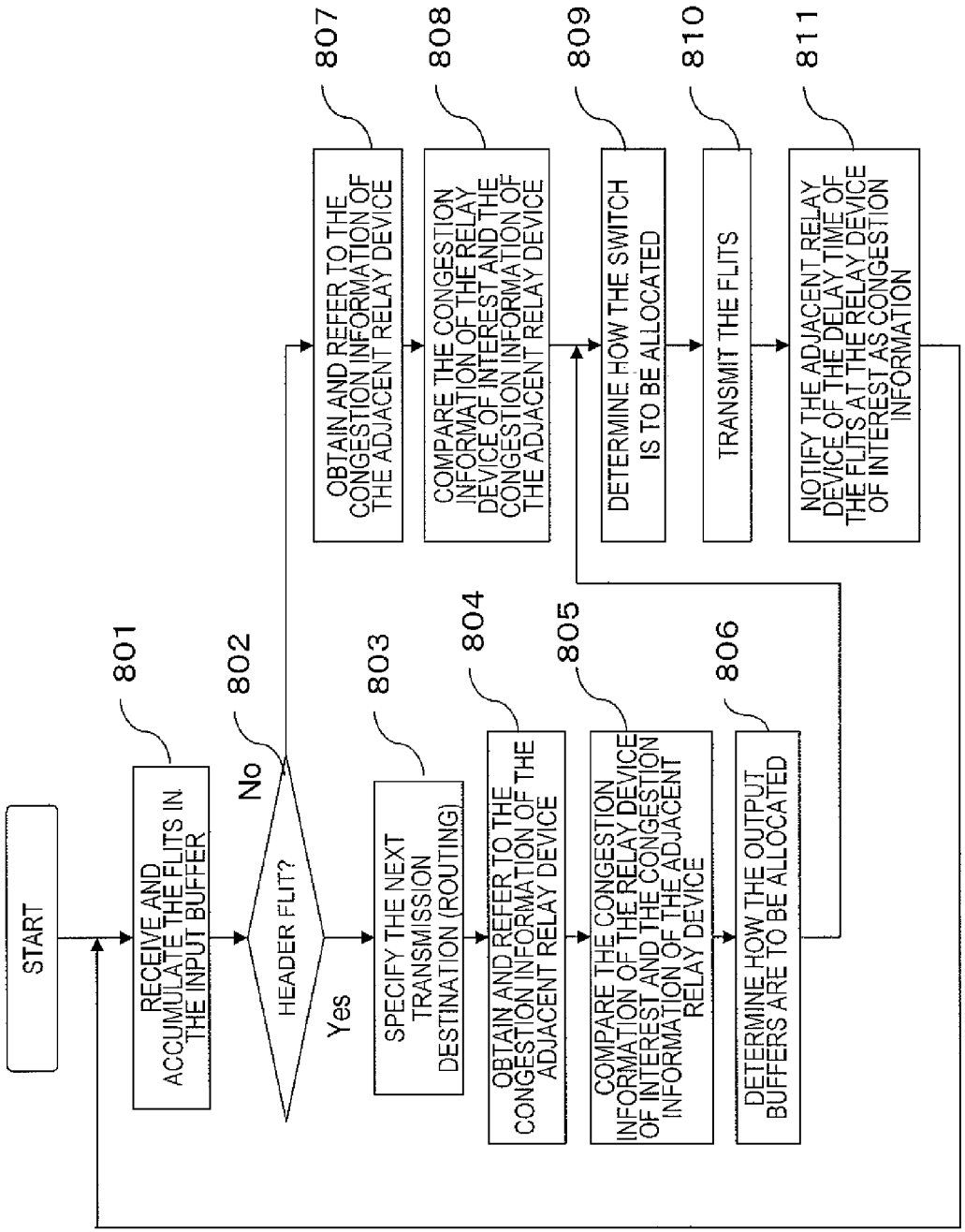
FIG. 8 is a flowchart showing a flow of operation of the relay device 700 in Embodiment 1.

FIG. 8 is a flowchart showing a flow of operation of the relay device 700 in this embodiment.

When a flit is sent from the nearby relay device 710, the relay device 700 accumulates the flit in a prescribed buffer among the input buffers 701 (step 801). There are various methods conceivable for selecting the buffer in which the flit is to be accumulated. For example, as described above, the flit transmitted from the output buffer of the previous-stage relay device 710 may be accumulated in the input buffer of the adjacent relay device 711 corresponding to the output buffer 703 thereof. In the case where there is no previous-stage relay device and the flit is directly transmitted from a bus master, the bus master may specify the input buffer in which the flit is to be accumulated and the relay device 700 may accumulate the flit in the input buffer specified by the bus master. Alternatively, in the case where the flit is a header flit, the flit may be accumulated in an empty buffer; whereas when the flit is not a header flit, the flit may be accumulated in the buffer in which the header flit corresponding to the flit is accumulated. The flits may be classified by packet so that the flits of different packets are accumulated in different input buffers.

The input buffer 701 determines whether or not the accumulated flit is a header flit (step 802).

In the case where the accumulated flit is a header flit, the processing advances to step 803 to perform processing for specifying the next receiving end of the data. In the case where the accumulated flit is not a header flit, the processing advances to step 807 to set the receiving end of the flit to the same route as that of the header flit corresponding to the flit.

In the case where the flit sent to the input buffer is a header flit, the routing processing section 704 determines the relay device to which the flit is to be transmitted next, based on the address information of the addressee provided in the header flit (step 803).

In the multistage interconnection network shown in FIG. 5, each memory is assigned an address of a three-digit binary number, and in the header flit of each packet, the address of the memory as the addressee is provided with a three-digit binary number.

The routing control section 704 of each relay device reads the numerical figure of the digit which is the same as the ordinal number of the stage of the relay device, among the three digits of the address provided in the header flit. The routing control section 704 determines the routes such that when the value is 0, the flit is sent to the upper right relay device in FIG. 5, whereas when the value is 1, the flit is sent to the lower right relay device in FIG. 5.

For, for example, sending data from the bus master BM2 to the memory 5 (address: 101), the relay device R1 transmits the flit to the lower right relay device R7 in accordance with the three-digit numerical figure described in the address. Next, the relay device R7 transmits the flit to the upper right relay device R10, and finally the relay device R10 transmits the flit to the lower right memory 5. Thus, the flit is transmitted from the bus master BM2 to the memory 5.

The method by which the routing processing section 704 controls the routing may also be any other method in accordance with the topology of the decentralized buses, as long as the flit is appropriately sent to the destination.

Once the adjacent relay device to which the flit is to be transmitted is determined, the relay device 700 obtains the congestion information from the adjacent relay devices 710 and 711 by means of the congestion information processing section 707 and refers to the congestion information (step 804).

Figure 9:
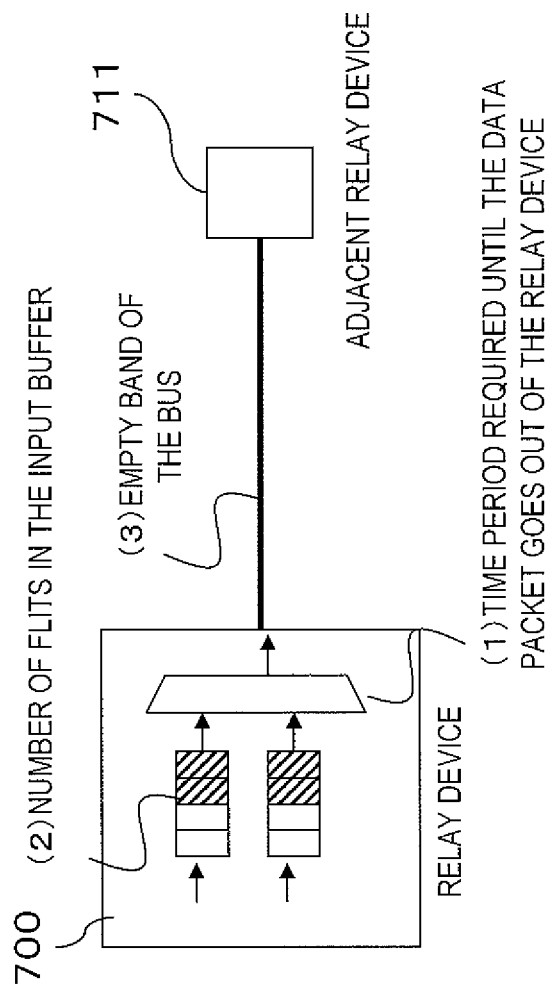
FIG. 9 shows a target of measurement on which the difficulty of flowing of packet data of each traffic on each transmission route can be quantitatively measured as congestion information.

FIG. 9 shows a target of measurement on which the difficulty of flowing of packet data of each traffic on each transmission route can be quantitatively measured. The measurement result is handled as congestion information. The congestion information is (1) the delay time required until the data packet goes out of the relay device 700, (2) the number of flits remaining in the input buffer, (3) the empty band of the bus, or the like in the relay device 700.

An integrated circuit is often desired to have the buffers on the circuit reduced to a minimum possible size due to the problem regarding the mounting area size, cost or the like. When the size of the input buffer is small for this reason, if (2) the number of flits in the input buffer is used as the index for measuring the congestion level, the precision is low. For measuring (3) the empty band of the bus, a memory (buffer) for recording the state of the bus for a prescribed time period is needed. By contrast, when (1) the delay time required until the data packet goes out of the relay device is used as the index for measuring the congestion level, the congestion level can be measured at high precision even with a small buffer size.

In this embodiment, a bus for transmitting an electric signal is assumed as the bus for connecting the relay devices to each other. Alternatively, the bus may be a wired bus for transmitting data by an optical signal or a wireless bus for transmitting a signal using a magnetic or electromagnetic wave. Communication by an optical signal or an electromagnetic wave allows different wavelengths or frequencies to be used at the same time on one bus. Therefore, the congestion level may be defined based on the number of used or non-used wavelengths or frequencies on the bus.

In the following description, it is assumed that the buffer sizes in the relay device 700 are small, and (1) the delay time required until the data packet goes out of the relay device 700 is used as the congestion information. As long as buffers are obtained without fail, the congestion information may be (2) or (3) above. The congestion information is obtained by the congestion information processing section 707.

Next, the congestion information comparison section 708 compares the congestion information at the relay device 700 and the congestion information at the adjacent relay device 710 (or the adjacent relay device 711) to find the congestion level indicating the difficulty of flowing of each traffic on the route (step 805).

Figure 10:
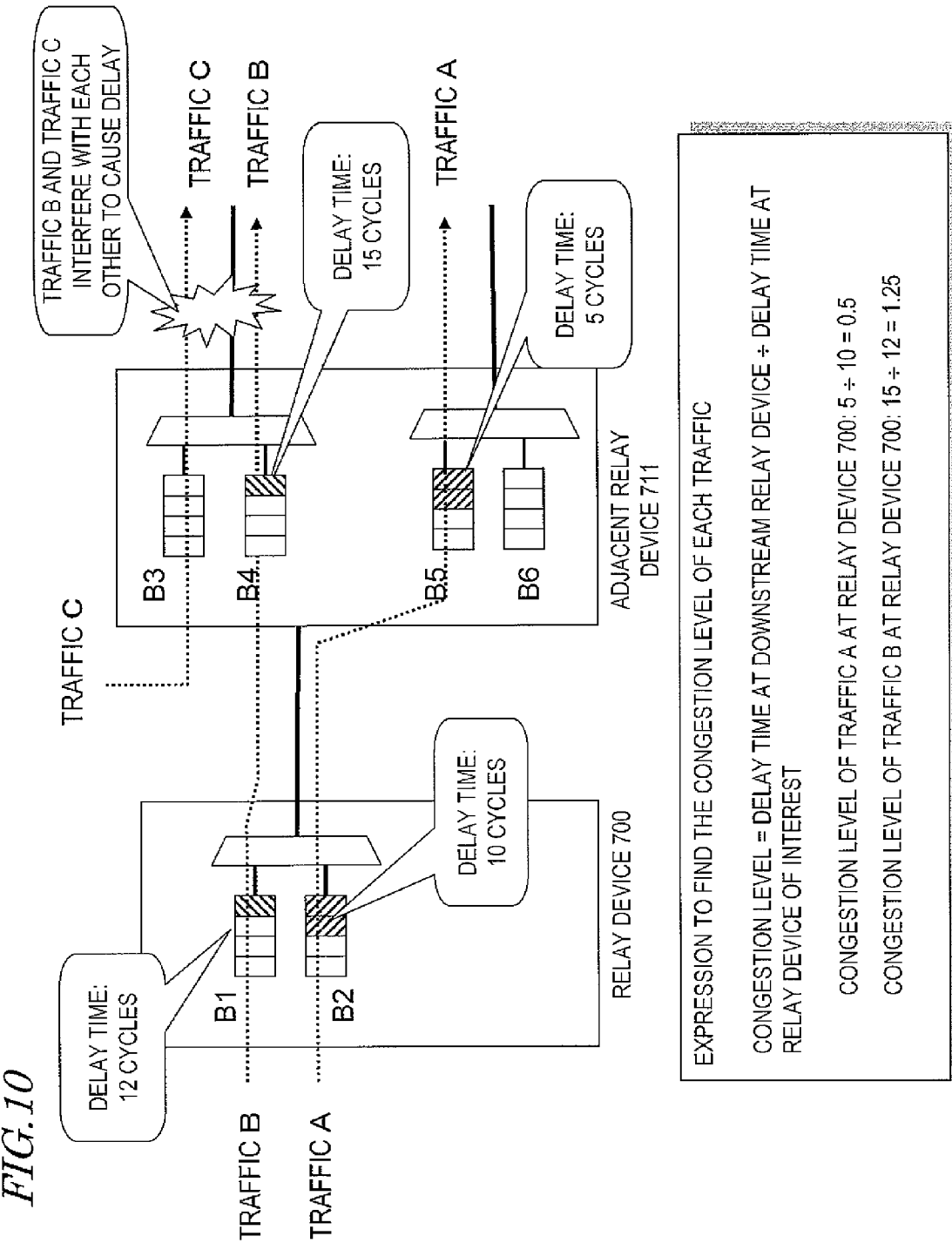
FIG. 10 shows a method by which a relay device 700 calculates a congestion level of each of the traffic A and the traffic B by comparing a congestion state of the relay device 700 and a congestion state of an adjacent relay device 711.

FIG. 10 shows a method by which the relay device 700 calculates the congestion level of each of the traffic A and the traffic B by comparing a congestion state of the relay device 700 and a congestion state of the adjacent relay device 711.

In this embodiment, the congestion information comparison section 708 defines, as the congestion level of each traffic, a ratio of the delay time of the data packet notified by the relay device 711 downstream to the relay device 700 and the delay time of the data packet at the relay device 700.

For example, in FIG. 10, it is assumed that a delay of 10 cycles is caused until the data packet of the traffic A goes out of the relay device 700 and a delay of 5 cycles is caused until the data packet of the traffic A goes out of the relay device 711 downstream with respect to the relay device 700. In this case, the congestion level of the traffic A can be calculated as follows.

Congestion level of the traffic $A$: $5/10=0.5$

By contrast, it is assumed that a relay of 12 cycles is caused until the data packet of the traffic B goes out of the relay device 700 and a delay of 15 cycles is caused until the data packet of the traffic B goes out of the relay device 711. In this case, the congestion level of the traffic B can be calculated as follows.

Congestion level of the traffic $B$: $15/12=1.25$

Where it is assumed that as the value of the congestion level is larger, the data packet has more difficulty flowing, it can be quantitatively specified that the data packet of the traffic A flows more easily than the data packet of the traffic B in the vicinity of the relay device 700.

In FIG. 10, the ratio of the delay time at the relay device 710 and the delay time at the relay device 711 is defined as the congestion level. Alternatively, for example, a difference between the delay time at the relay device 710 and the delay time at the relay device 711, a total sum of the delay time at the relay device 710 and the delay time at the relay device 711, or any other value obtained by comparing the congestion information of the relay device 700 and the congestion information of the adjacent relay device 711 may be defined as the congestion level.

Still alternatively, the correspondence between the value of the delay time of each relay device and values of the congestion levels may be defined in advance as table information. In this case, the congestion level corresponding to the notified delay time can be found by the table information being referred to.

Next, in step 806 in FIG. 8, based on the congestion levels of the traffics, the transmission scheduling adjustment section 709 determines priority ranks of input buffers by which the flits are to be transmitted from the input buffers. The priority ranks are determined on the input buffers, the congestion levels of which have been found. The "input buffers, the congestion levels of which have been found" have the same congestion levels as those of the corresponding traffics. Namely, where there is a traffic t having a congestion level x, the congestion level of the input buffer to which the flit of the traffic t is to be input is x. The buffer allocation section 705 allocates the output buffers based on the priority ranks of the input buffers.

Figure 11:
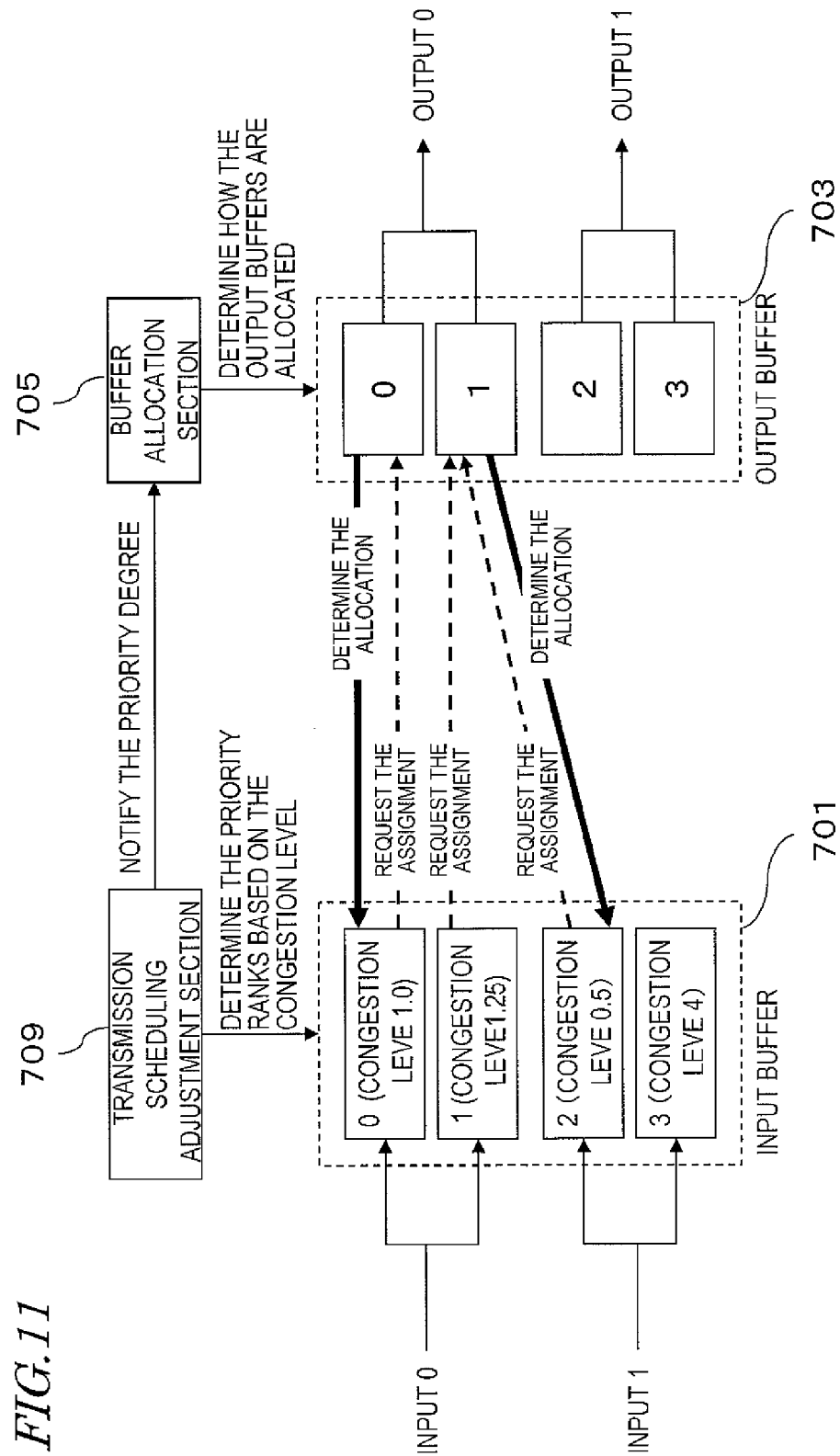
FIG. 11 shows a method by which a transmission scheduling adjustment section 709 and a buffer allocation section 705 allocate output buffers 703.

FIG. 11 shows a method by which the transmission scheduling adjustment section 709 and the buffer allocation section 705 allocate the output buffers 703.

In the input buffers in the relay device, flits are accumulated as being classified by traffic, and are transmitted to the next relay device via the output buffers.

In FIG. 11, an input buffer 0 and an input buffer 1 are prepared for traffics from input 0, and an input buffer 2 and an input buffer 3 are prepared for traffics from input 1. It is assumed that the congestion information comparison section 708 has found the congestion levels of the input buffers 0, 1 and 2 as 1.0, 0.25 and 0.5, respectively.

Which output buffer is requested by each input buffer to be assigned is specified by the transmission route on which the flits of each traffic accumulated in each input buffer are transmitted to the memory as described above. Since two output buffers connected to the same output are occasionally requested by different input buffers to be allocated, how the output buffers are to be allocated needs to be determined.

The transmission scheduling adjustment section 709 provides the input buffers respectively with the priority ranks by which the input buffers are allocated the output buffers, based on the information on the congestion levels found by the congestion information comparison section 708. In the example of FIG. 11, it is assumed that the congestion levels of the input buffers are used as they are for the priority ranks by which the input buffers are allocated the output buffers. The priority ranks regarding the allocation of the output buffers are provided such that as the value of the congestion level of an input buffer which accumulates flits sent from a certain output buffer is smaller, the input buffer is allocated the output buffer with a higher level of priority.

Once the priority of each input buffer is determined, each input buffer requests that an unused output buffer, among the output buffers on the output side connected to the next relay device specified by the routing processing section 704, be allocated to the input buffer.

The buffer allocation section 705 notifies an input buffer having the lowest congestion level, among the input buffers requesting that the output buffers be allocated, that the output buffer has been determined to be allocated to the input buffer.

In the example of FIG. 11, the input buffer 0, the input buffer 1 and the input buffer 2 request that the output buffers on the output side be allocated to the input buffers. Regarding each output buffer requested, the input buffer having the lowest congestion level is determined to be allocated the corresponding output buffer; in this example, the input buffer 0 and the input buffer 2 are allocated the corresponding output buffers.

How the output buffers are allocated is determined at the time of transmission of the header flit. The state in which these output buffers are allocated is kept until all the flits included in the packet corresponding to the header flit are transmitted.

Next, the switch allocation section 706 connects the input buffers and the output buffers in the order from the input buffer having the lowest congestion level, and thus transmits the flits in the input buffers to the adjacent relay devices (step 807).

Figure 12:
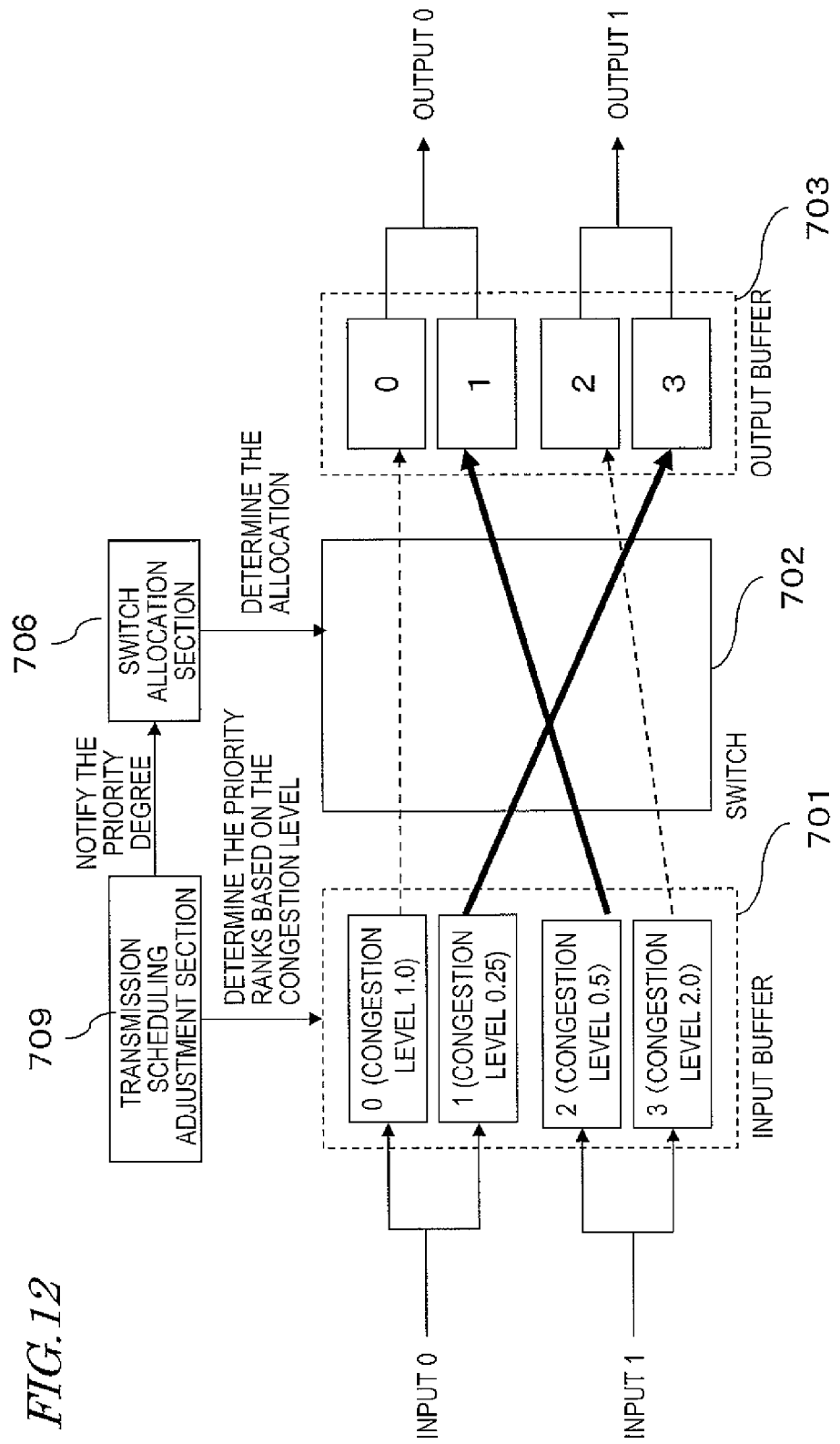
FIG. 12 shows a method for adjusting transmission scheduling among traffics which are allocated output buffers by a switch allocation section 706.

FIG. 12 shows a method for adjusting transmission scheduling among the traffics which are allocated the output buffers by the switch allocation section 706.

In this embodiment, the relay device performs the transmission scheduling by switching the connection between the input buffers and the output buffers.

In FIG. 12, the allocation of the output buffers to all the input buffers has been completed. An output buffer 0 is allocated to the input buffer 0, and an output buffer 3 is allocated to the input buffer 1. An output buffer 1 is allocated to the input buffer 2, and an output buffer 2 is allocated to the input buffer 3.

The switch allocation section 706 connects the switch to the input buffer having the lowest congestion level among the input buffers which are connectable to the output buffers connected to each output, and thus permits the flits to be transmitted to the adjacent relay device. The switch allocation section 706 can connect the switch to different input buffer/output buffer combinations at the same time.

With reference to FIG. 12, the output buffer 0 and the output buffer 1 connected to an output 0 will be discussed. The congestion level of 0.5 of the input buffer 2 allocated the output buffer 1 is lower than the congestion level of 1.0 of the input buffer 0 allocated the output buffer 0. Therefore, the switch is connected to the input buffer 2 and to the output buffer 1. When the input buffer connected to the switch becomes empty with the transmission of the flits therefrom being completed, the switch is connected to the input buffer 0 and to the output buffer 0 and thus the flits are transmitted.

Similarly, the output buffer 2 and the output buffer 3 connected to an output 1 will be discussed. The congestion level of 0.25 of the input buffer 1 allocated the output buffer 3 is lower than the congestion level of 2.0 of the input buffer 3 allocated the output buffer 2. Therefore, the switch is connected to the input buffer 1 and to the output buffer 3. When the input buffer connected to the switch becomes empty with the transmission of the flits therefrom being completed, the switch is connected to the input buffer 3 and to the output buffer 2 and thus the flits are transmitted. As a result, the flits are transmitted to the different adjacent relay devices respectively.

In this manner, the priority ranks regarding the switch allocation are adjusted based on the values of the congestion levels of the traffics. Thus, the amount of the transmission band of the bus on the output side which is to be allocated to each traffic can be adjusted.

As the method for shifting the switch, weighted round robin (WRR) may be used instead of the method of connecting the switch to the input buffers one by one, starting from the input buffer having the lowest congestion level, and thus emptying the input buffers one by one.

Figure 13:
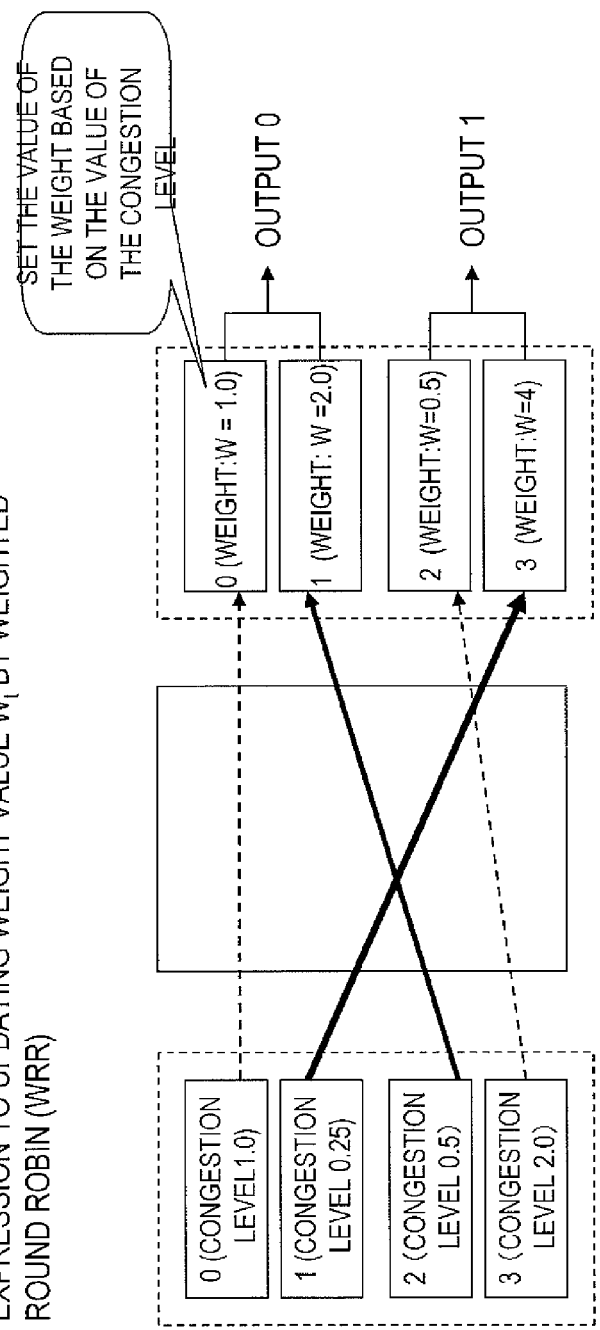
FIG. 13 shows a method for allocating the weight when the switch is shifted by the weighted round robin.

FIG. 13 shows a method for assigning the weight when the switch is shifted by the weighted round robin.

According to the weighted round robin, each of all the input buffers, which have been requested to transmit flits, is connected to the switch at a probability corresponding to (in proportion to) the value of the weight given to each of the output buffers, each time when one flit is transmitted. The calculation processing of the weight and the assigning processing described below are executed by the transmission scheduling adjustment section 709.

In the example of FIG. 13, the output buffers are each given a weight, which is the inverse number of the congestion level of the input buffer which is allocated the output buffer. Specifically, the weight given to the output buffer 0 is the inverse number of the congestion level of 1.0 of the input buffer 0, namely, 1.0. The weight given to the output buffer 1 is the inverse number of the congestion level of 0.5 of the input buffer 2, namely, 2.0. The weight given to the output buffer 2 is the inverse number of the congestion level of 2.0 of the input buffer 3, namely, 0.5. The weight given to the output buffer 3 is the inverse number of the congestion level of 0.25 of the input buffer 1, namely, 4.

When the connection is switched by the weighted round robin, the output 0 transmits flits via the output buffer 0 and the output buffer 1 at a ratio of 1:2, based on the weights given to the output buffer 0 and the output buffer 1. The output 1 transmits flits via the output buffer 2 and the output buffer 3 at a ratio of 1:8, based on the weights given to the output buffer 2 and the output buffer 3.

As described above, with the transmission scheduling by the weighted round robin, the ratio at which the transmission band of the bus on the output side is allocated to the output buffers can be adjusted in accordance with the values of the weights given to the output buffers.

In steps 806 and 809 in FIG. 8, the values of the congestion levels are used as they are for allocating the output buffers and the switch. Alternatively, any other definition may be used as long as the values of the congestion levels are reflected. In the above example, an input buffer which is to be prioritized regarding the allocation of the output buffer and the switch is given a low priority rank. Oppositely, such an input buffer may be given a high priority rank so that an input buffer having a high priority rank is allocated the output buffer and the switch with priority.

Specific methods usable for adjusting the assignment of the transmission band to the output buffers by use of the weighted round robin include a method of dividing the transmission band by time into a plurality of time slots and assigning the time slots of a number specified in accordance with the value of the weight to the corresponding output buffer, and a method of selecting an output bus (output buffer) stochastically at a ratio specified in advance in accordance with the value of the weight.

When a flit other than the header flit is to be transmitted, neither the routing in step 803 nor the allocation of the output buffers in step 806 is performed. The congestion information processing section 707 obtains and refers to the congestion information of the adjacent relay device (step 807), and the congestion information comparison section 708 merely compares the congestion state of the relay device 700 and the congestion state of the nearby relay device (step 808). The method for obtaining and referring to the congestion information of the adjacent relay device (step 807) and the method for comparing the congestion state of the relay device 700 and the congestion state of the nearby relay device (step 808) are the same as the processing in step 804 and step 805 respectively, and so will not be described.

When the switch allocation section 706 determines how the switch 702 is to be allocated, the relay device 700 transmits the flits in the input buffer to the adjacent relay device 711 via the output buffer allocated to the input buffer (step 810).

The congestion information processing section 707 notifies the nearby relay devices 710 and 711 of the congestion information of the relay device after the transmission of the flits (step 811).

Now, with reference to FIGS. 14, 15 and 16, the operation of the relay device in this embodiment will be described in detail.

Figure 14:
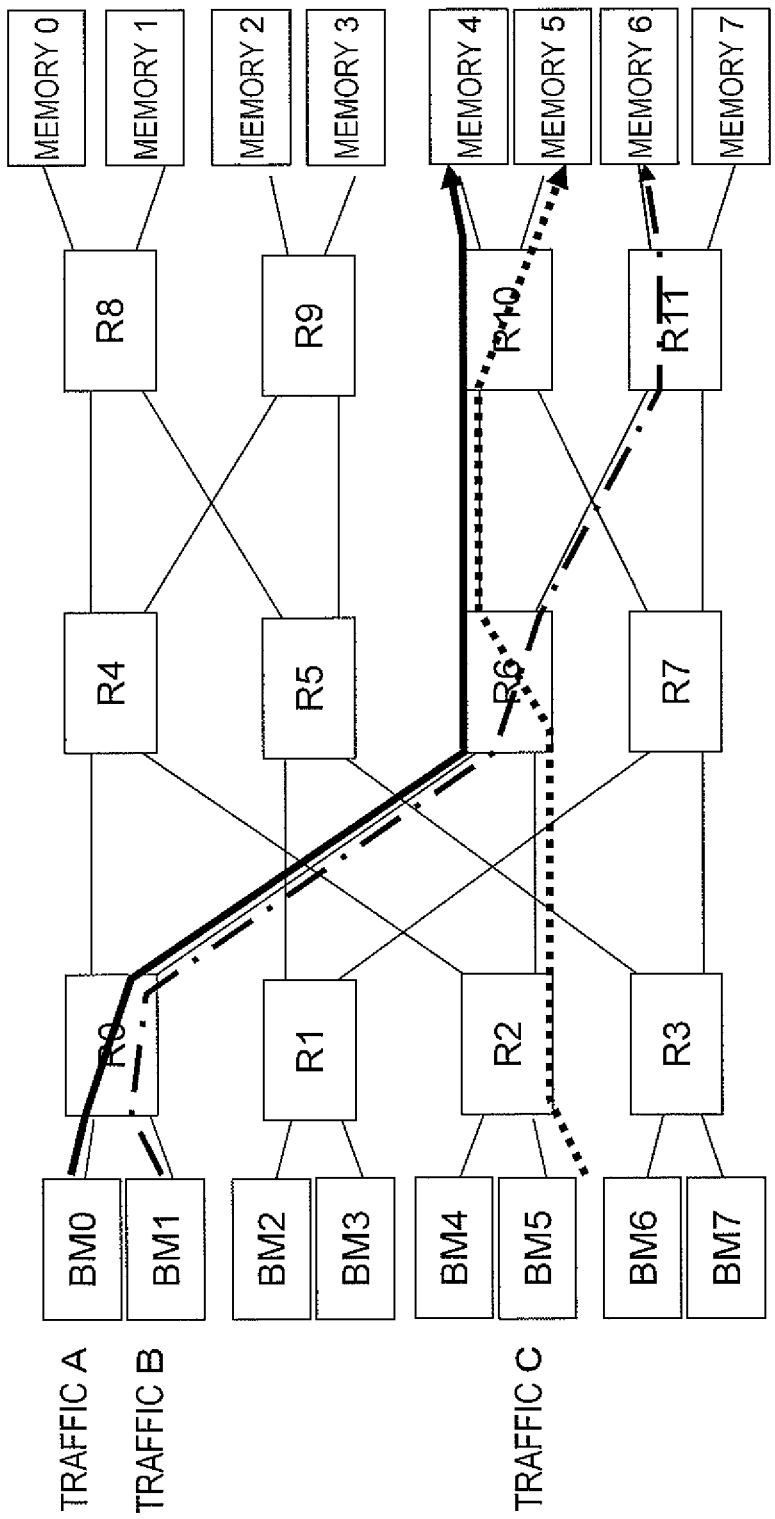
FIG. 14 shows the transmission route of each of the traffics A through C in the multistage interconnection network shown in FIG. 5.

FIG. 14 shows the transmission route of each of the traffics A through C in the multistage interconnection network shown in FIG. 5. The traffic A is transmitted from the bus master BM0 to the memory 4. The traffic B is transmitted from the bus master BM1 to the memory 6. The traffic C is transmitted from the bus master BM5 to the memory 5.

When the traffic A and the traffic B flow at the same time, interference occurs on the bus from the relay device R0 to the relay device R6. When the traffic A and the traffic C flow at the same time, interference occurs on the bus from the relay device R6 to the relay device R10.

Figure 15:
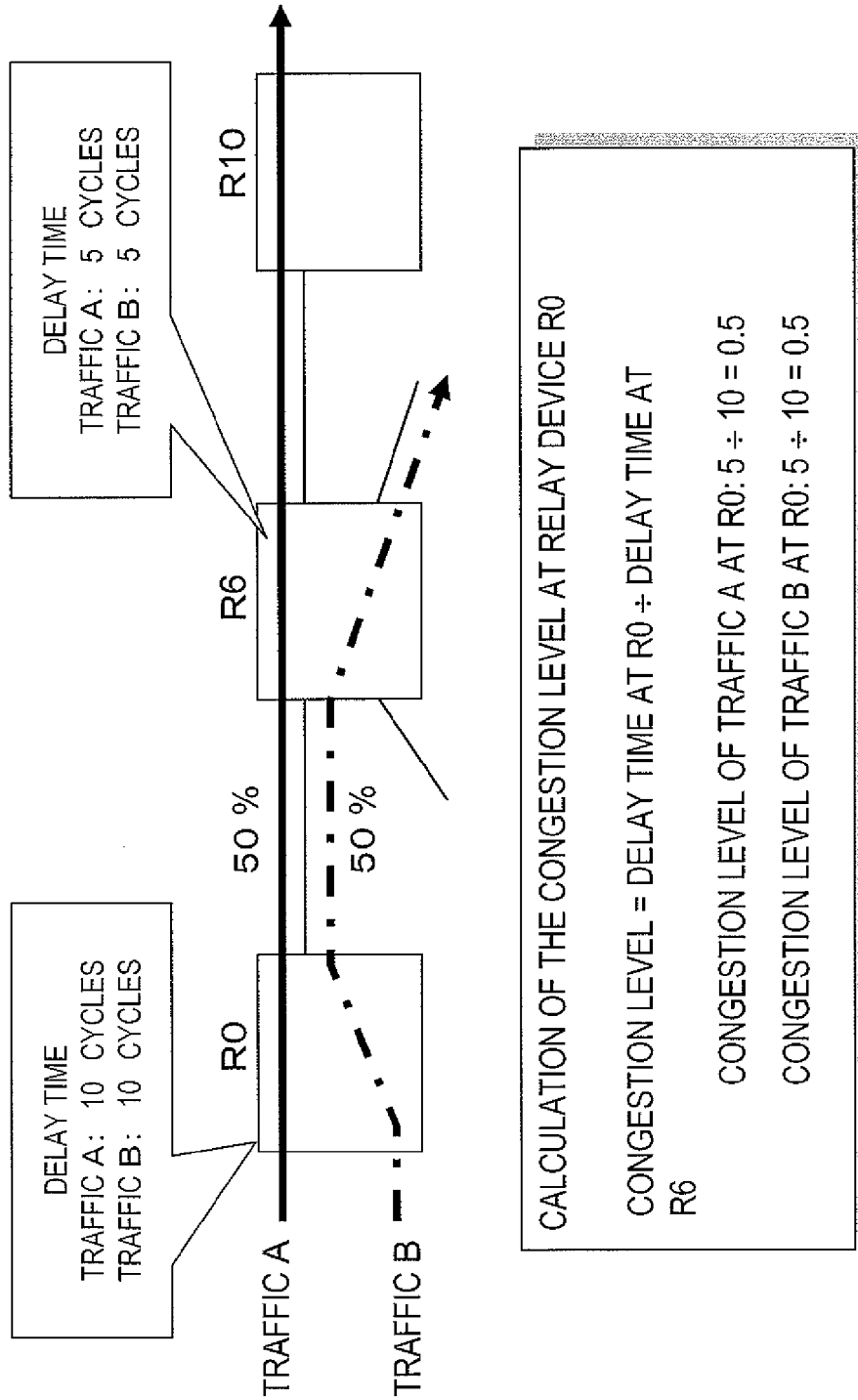
FIG. 15 shows an example of delay time of the traffic A at each relay device on the transmission route when the traffic A and the traffic B flow at the same time.

FIG. 15 shows an example of delay time of the traffic A at each relay device on the transmission route when the traffic A and the traffic B flow at the same time.

In FIG. 15, it is assumed that the delay time of each of the traffic A and the traffic B at the relay device R0 is 10 cycles due to the mutual interference. It is also assumed that the delay time of each of the traffic A and the traffic B at the relay device R6 is 5 cycles because the traffic A and the traffic B flow on different routes. Thus, the congestion level of the traffic A at the relay device R0 is 0.5, and the congestion level of the traffic B at the relay device R0 is 0.5. The traffics have the same level of difficulty flowing on the transmission route. Therefore, the relay device R0 adjusts the transmission scheduling such that 50% of the transmission band of the bus to the relay device R6 is allocated to each of the traffic A and the traffic B. The term "scheduling" means the allocation of the output buffers and the switch. This is also applied to the following examples.

Figure 16:
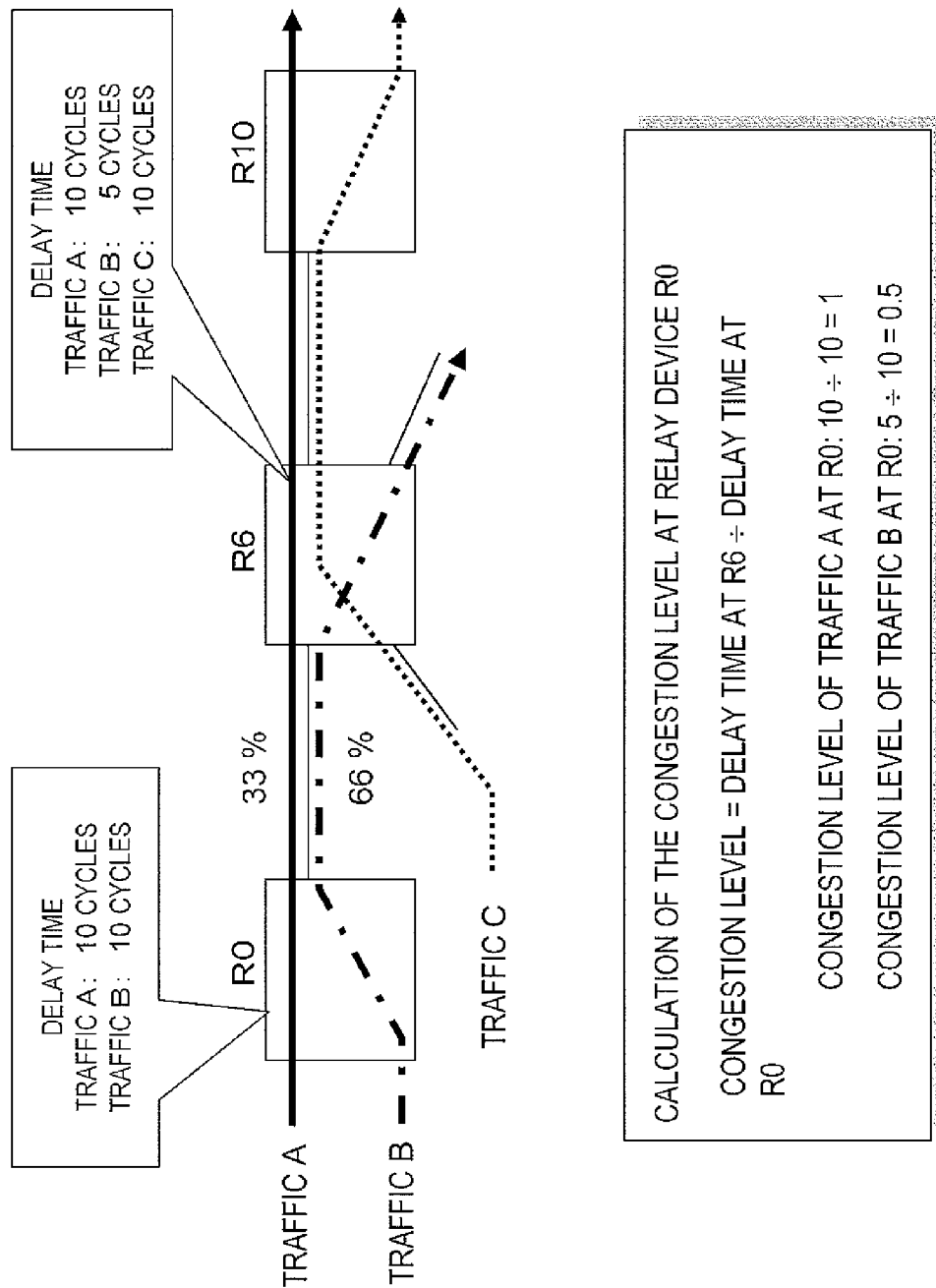
FIG. 16 shows an example of delay time of each of the traffic A, the traffic B and also the traffic C at each relay device when these traffics flow at the same time.

FIG. 16 shows an example of delay time at each relay device when the traffic A, the traffic B and also the traffic C flow at the same time.

In FIG. 16, it is assumed that the delay time of each of the traffic A and the traffic B at the relay device R0 is 10 cycles due to the mutual interference. It is also assumed that the delay time of each of the traffic A and the traffic C at the relay device R6 is 10 cycles due to the mutual interference. At the relay device R6, the delay time of the traffic B is 5 cycles because the traffic B flows on a different route and does not interfere with the other traffics. Thus, the congestion level of the traffic A at the relay device R0 is 1, and the congestion level of the traffic B at the relay device R0 is 0.5. It is specified that the traffic A has more difficulty flowing than the traffic B on the transmission route.

The relay device R0 assigns the transmission band of the bus to the relay device R6 in accordance with the congestion levels of the traffic A and the traffic B. For example, when the relay device R1 assigns the transmission band to each of the traffics in inverse proportion to the value of the congestion level of each traffic using the weighted round robin, the relay device R0 adjusts the transmission scheduling such that 33% of the transmission band is assigned to the traffic A and 66% of the transmission band is assigned to the traffic B.

When the part of the transmission band assigned to the traffic A is decreased by the relay device R0, the interference between the traffic A and the traffic B at the relay device R0 is alleviated. Therefore, the delay time of the traffic B is shortened. At the relay device R6, the interference between the traffic A and the traffic C is alleviated. Therefore, the delay time of the traffic C is shortened.

As described above, the part of the transmission band assigned to the traffic A interfering with a plurality of traffics on the transmission route is decreased in accordance with a change in the number or the flow rate of the traffics. In this manner, the part of the transmission band assigned to each of the traffic B and the traffic C which do not interfere with each other is increased, and thus the traffic B and the traffic C are allowed to flow with priority. Owing to this, the reduction of the utilization factor of the entire circuit can be prevented and thus the extension of the delay or the decrease of the throughput can be suppressed.

Figure 17:
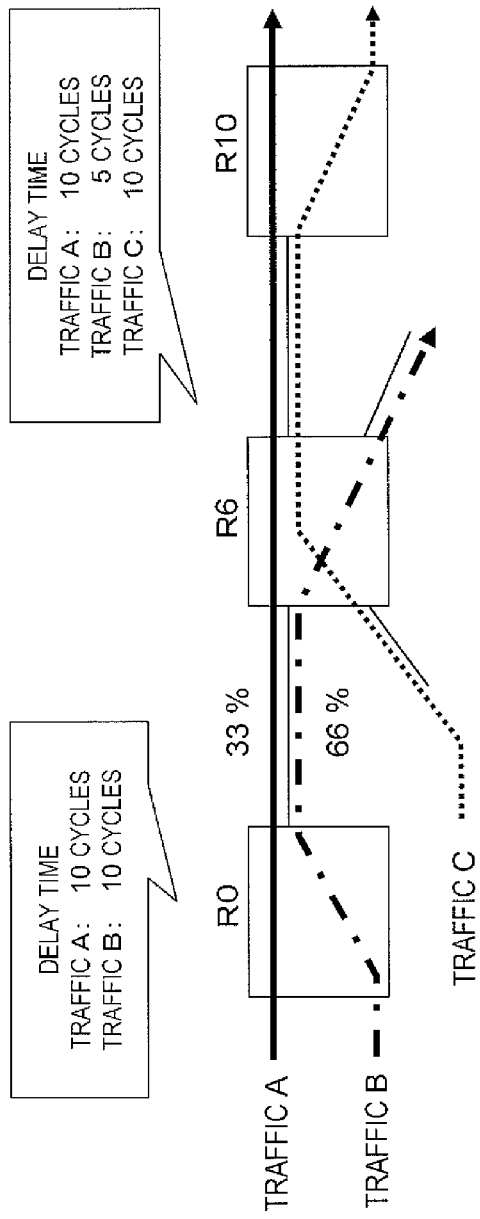
FIG. 17 shows an example in which a difference between the congestion information of the relay device of interest and the congestion information of an adjacent relay device, instead of the ratio thereof, is used to define the congestion level.

FIG. 17 shows an example in which a difference between the congestion information of the relay device in this embodiment and the congestion information of the adjacent relay device, instead of the ratio thereof, is used to define the congestion level.

In FIG. 17, a value obtained by subtracting the delay time at the adjacent relay device, to which the traffic is to be transmitted, from the delay time at the relay device of interest is defined as the congestion level regarding each traffic. In the expression shown in FIG. 17, constant α is added so that the congestion level can be handled by the weighted round robin. This makes it possible to handle the congestion level as a positive numerical value. A specific value of constant α may be the maximum value of the delay time permissible at the delay device so that the congestion level is not a negative value.

In this embodiment, an example in which the transmission scheduling (allocation of the output buffers, allocation of the switch) is adjusted based on the congestion information of the downstream relay device to which the traffic is to flow has been described. Alternatively, the transmission scheduling may be adjusted based on the congestion information of the upstream relay device from which the traffics have flown.

Figure 18:
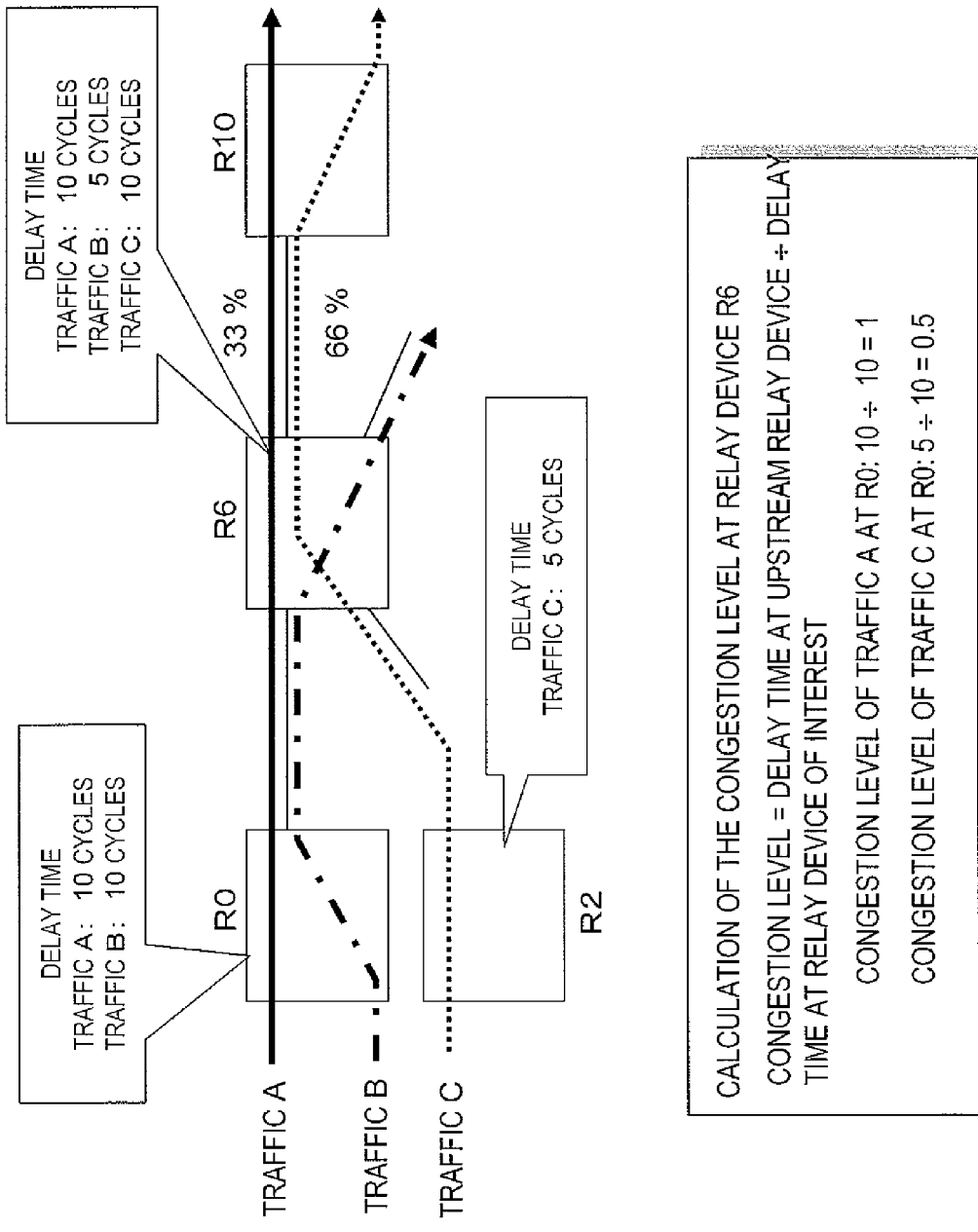
FIG. 18 shows how the transmission band of the bus to a relay device R10 is assigned to the traffic A and the traffic C based on the delay times at a relay device R0 and the delay times at a relay device R2, both relay devices being located upstream in the flow of the traffics.

FIG. 18 shows how the transmission band of the bus to the relay device R10 is assigned by the relay device R6 to the traffic A and the traffic C based on the delay times at the relay device R0 and the delay times at the relay device R2, both relay devices being located upstream in the flow of the traffics.

In FIG. 18, it is assumed that the delay time of each of the traffic A and the traffic B at the relay device R0 is 10 cycles due to the mutual interference. It is also assumed that the delay time of each of the traffic A and the traffic C at the relay device R6 is 10 cycles due to the mutual interference. It is assumed that at the relay device R2, the delay time is 5 cycles because only the traffic C flows.

The relay device R6 obtains the delay times of the traffic A and the traffic B from the relay device R0, obtains the delay time of the traffic C from the relay device R2, and calculates the congestion level by comparing the delay times of these traffics at the relay device R6. Like in the case where the congestion level is calculated by use of the delay times notified by the downstream relay device to which the traffics are to be transmitted, the value of a ratio of the delay time at the relay device R6, which is on the downstream side, with respect to the delay time at the upstream relay device from which the traffics have flown is used to define the congestion level.

The congestion levels of the traffic A is found to be 1 (=10÷10), and the congestion level of the traffic B is found to be 0.5 (=5÷10).

Once the congestion levels are found, in the case where the relay device R1 assigns the transmission band to each traffic in inverse proportion to the value of the congestion level using, for example, the weighted round robin, the relay device R6 adjusts the transmission scheduling such that 33% of the transmission band is assigned to the traffic A and 66% of the transmission band is assigned to the traffic C.

The relay device R6 may use the congestion information from the downstream relay device, in addition to the congestion information from the upstream relay device from which the traffics have flown, to find the congestion level on the transmission route and use such a congestion level to adjust the transmission scheduling.

For example, the congestion level on the upstream side and the congestion level on the downstream side may be found for each traffic, and the average value thereof may be defined as the congestion level.

As described above, by the structure described with reference to FIG. 7 and the processing described with reference to FIG. 8, each relay device on the transmission route exchanges the congestion information with an adjacent relay device, compares the congestion information, and adjusts the transmission scheduling of each traffic based on the congestion level indicating the difficulty of flowing of each traffic on the transmission route obtained by the comparison. Owing to this, the extension of delay caused by the interference among the traffics can be suppressed.

Figure 19:
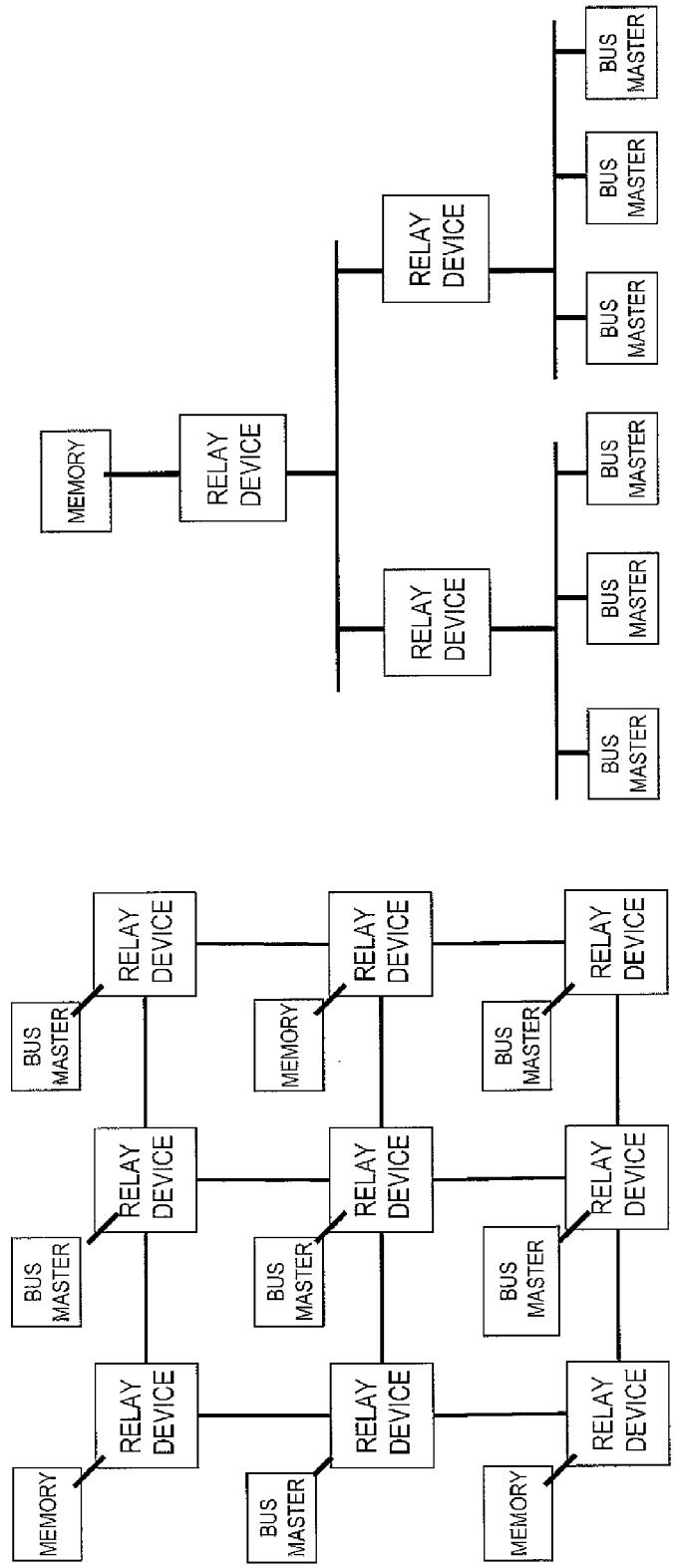
FIG. 19 shows various topologies of relay devices.

In this embodiment, the topology of the integrated circuit is a multistage interconnection network as an example. Alternatively, the present invention is also applicable to topologies in which traffics are transmitted on a plurality of buses via relay devices and switches, for example, a mesh-type topology as shown in FIG. 19 in which relay devices are arranged in a lattice, a torus-type topology, or a hierarchical topology as shown in FIG. 19 in which buses are connected in a hierarchical manner.

Embodiment 2

In Embodiment 1, congestion information is exchanged between adjacent relay devices, and the transmission scheduling of each traffic is adjusted based on the congestion level indicating the difficulty of flowing of the data packet of each traffic on the transmission route.

By contrast, a relay device in this embodiment compares the found congestion levels, once disposes of the data packet which has more difficulty flowing, and requests the bus master, which is the transmitting end of the disposed packet, to re-transmit the packet. Thus, the extension of the delay time of the traffic having a lower congestion level can be suppressed. It should be noted that the request to re-transmit the packet is not made directly to the bus master, but a flit addressed to the bus master and including a request to re-transmit the packet is transmitted to the buffer of the adjacent relay device from which the packet has been transmitted. The adjacent relay device transmits the re-transmission request to a relay device or a bus master upstream thereto.

The relay device can transmit the re-transmission request in one flit, namely, a data amount which can be transmitted in one cycle. The number of flits may be two or more. Alternatively, the re-transmission request may be transmitted in a packet. The re-transmission request may be transmitted on the transmission route on which usual traffics flow; or alternatively, a transmission route dedicated for re-transmission requests may be provided.

In control of networks such as the Internet, wireless LANs and the like, disposal of packets is generally used as a method for suppressing the congestion (crowding) at relay devices. However, integrated circuits are desired to have a high level of reliability. Therefore, when a data loss of a traffic flowing in the circuit occurs, the packet disposed of at the time of congestion needs to be re-transmitted from the transmitting end.

Figure 20:
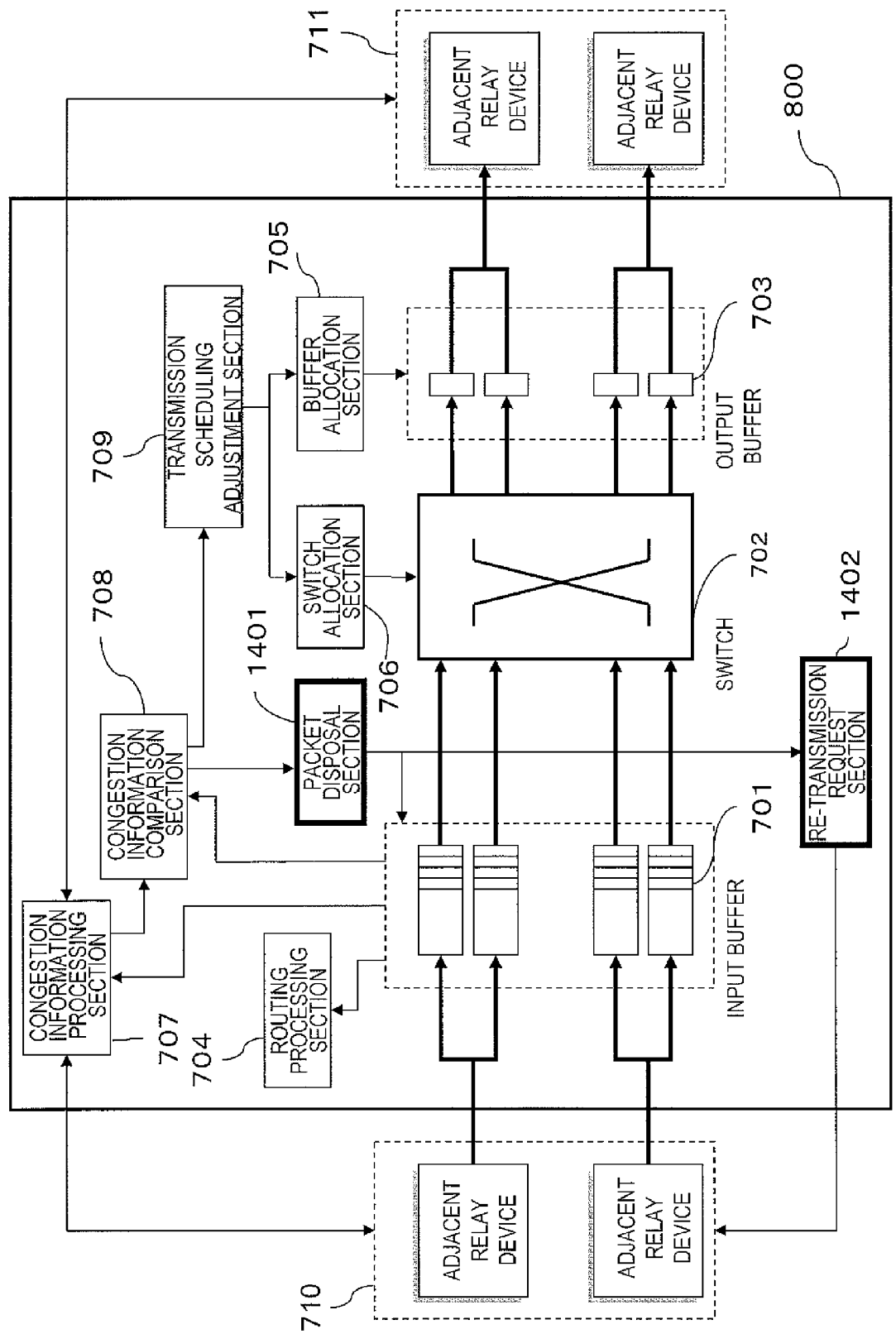
FIG. 20 is a structural view of a relay device 800 in Embodiment 2.

FIG. 20 is a structural view of a relay device 800 in this embodiment. Among the elements shown in FIG. 20, the same elements as those in FIG. 7 bear the same reference signs thereto and the description thereof will be omitted.

When detecting that the congestion level of a traffic found by the congestion information comparison section 708 exceeds a prescribed threshold level, a packet disposal section 1401 deletes the packet of the traffic from the input buffer 701.

A re-transmission request section 1402 notifies a re-transmission request for the packet deleted by the packet disposal section to the bus master which is the transmitting end of the packet.

Figure 21:
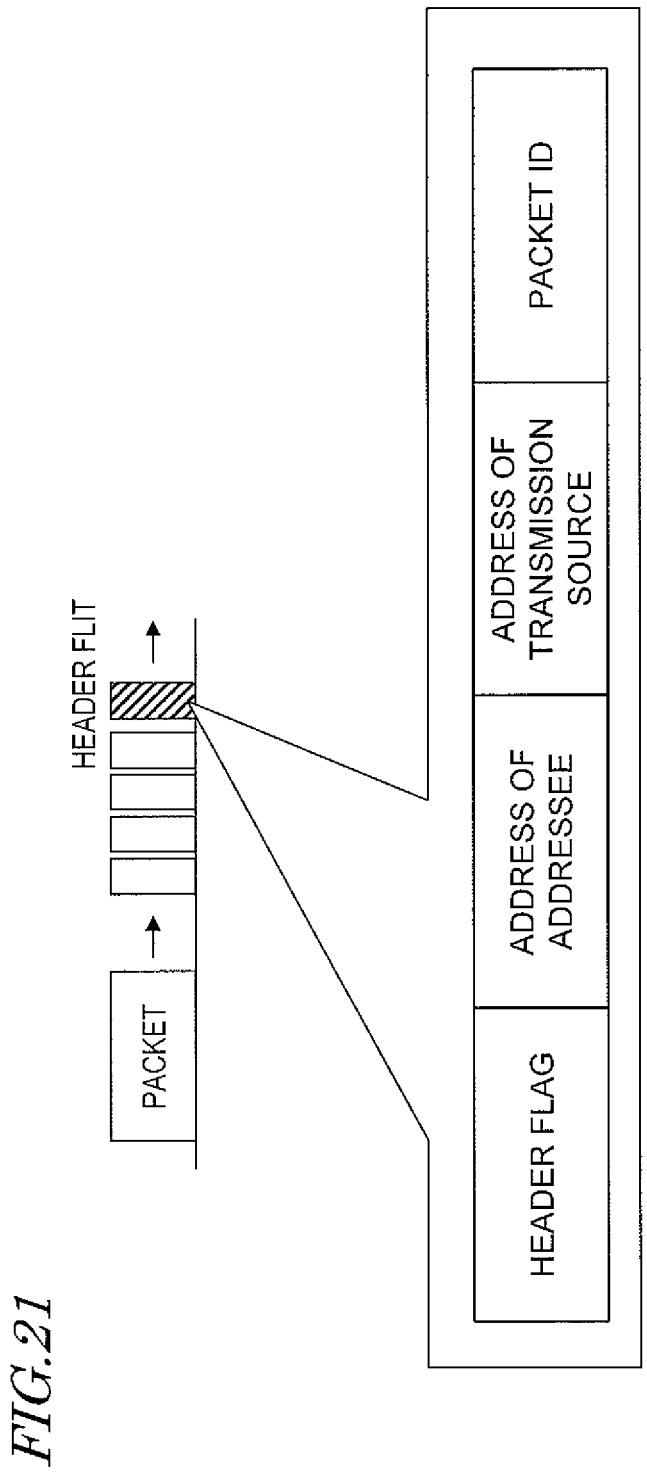
FIG. 21 shows a packet transmitted from a bus master, a group of flits in the packet, and information described in a header flit in Embodiment 2.

FIG. 21 shows a packet transmitted from the bus master, a group of flits in the packet, and information described in a header flit in this embodiment. In the header flit, a header flag, an address of the addressee, an address of the transmitting end, and an ID of the packet are described. As a preparation for the case where the packet disposal section 1401 disposes of packets, each time when a header flit arrives, the re-transmission request section 1402 stores the information in the header flit of the packet (at least the address of the transmitting end and the ID of the packet). Based on the stored information, the re-transmission request section 1402 requests the bus master which is the transmitting end to re-transmit the packet having a specific ID.

The bus master, the packet from which has been disposed of, waits for a prescribed time period in order to avoid congestion and then starts transmitting the packets.

Figure 22:
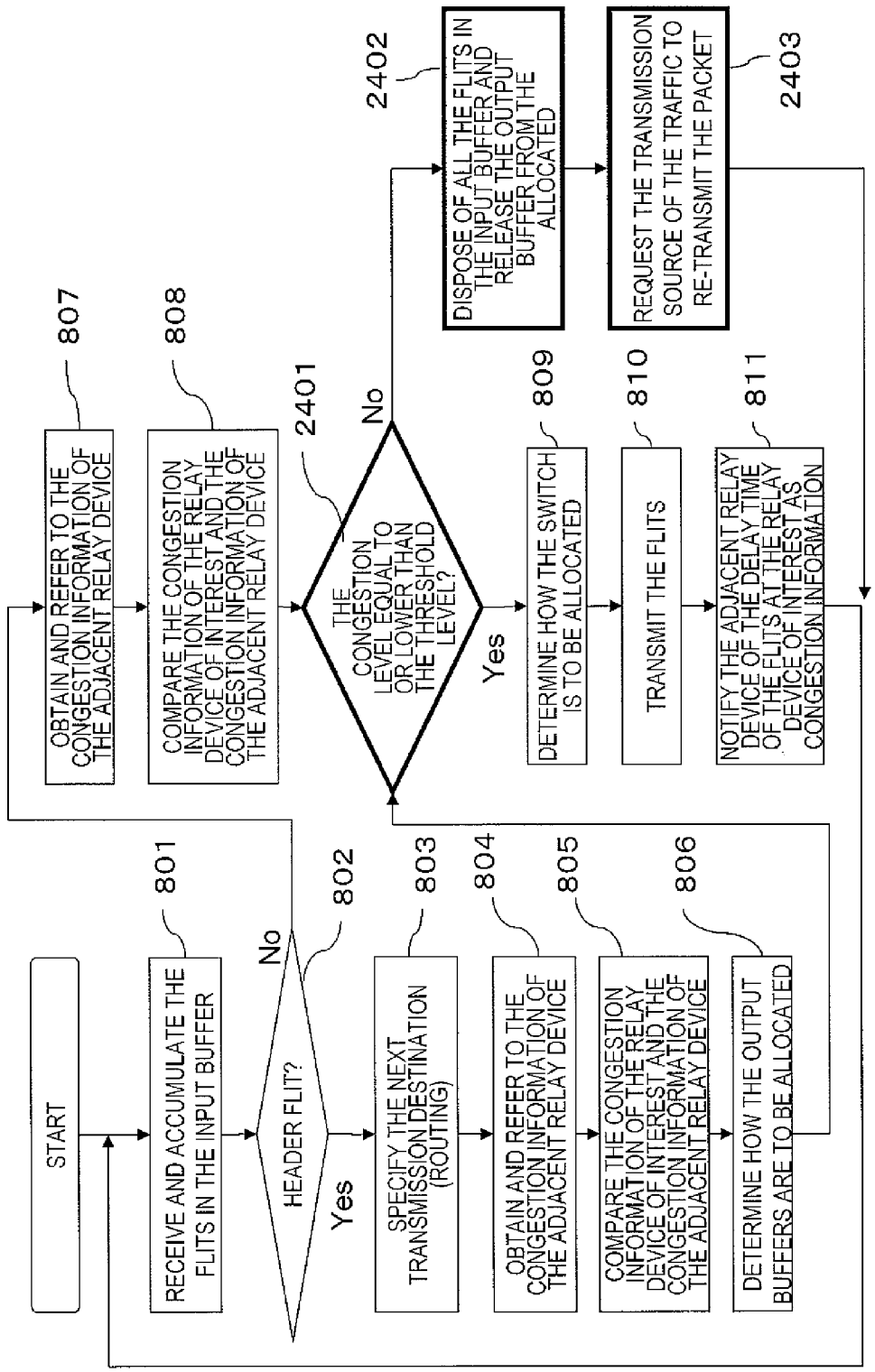
FIG. 22 shows an operation of the relay device 800 in Embodiment 2.

FIG. 22 shows an operation of the relay device 800 in this embodiment.

Substantially the same steps as those in FIG. 8 bear the same reference signs thereto and the descriptions thereof will be omitted.

The relay device 800 exchanges congestion information with the adjacent relay device 710 calculates the difficulty of flowing of each traffic on the route as the congestion level, and determines whether or not the value of the congestion level is equal to or lower than a prescribed threshold level (step 2401). When the value of the congestion level is equal to or lower than the threshold level, the processing advances to step 809 in order to perform the switch allocation processing for transmitting the flits from the input buffer.

When the congestion level is determined to exceed the threshold level in step 2401, the packet disposal section 1401 in the relay device 800 disposes of all the flits in the corresponding input buffer and also releases the output buffer corresponding to the input buffer from the allocation (step 2402).

Once the flits in the input buffer corresponding to the congestion level which exceeds the prescribed threshold level are disposed of, the re-transmission request section 1402 in the relay device requests the transmitting end of the disposed packet to re-transmit the disposed packet (step 2403).

Usable methods by which the re-transmission request section 1402 notifies the transmitting end of the re-transmission request include a method of transferring a packet notifying the re-transmission request in the opposite direction on the transmission route on which the traffics have flown, and a method of using a dedicated control signal line for sending the re-transmission request between the relay device 800 and the transmitting end.

By additionally having the above-described structure and additionally performing the above-described processing, the relay device 800 in this embodiment disposes of a packet of a traffic having a congestion level higher than the prescribed threshold level. Therefore, the reduction of the transmission performance of the entire circuit caused by the traffic, the packet data of which has difficulty flowing, can be suppressed.

Embodiment 3

In this embodiment, for transmitting packets having the same addressee continuously to the next relay device, the same output buffer is used. Also, it is notified to the next relay device that the packets transmitted continuously are directed to the same addressee. Thus, the routing processing (step 803) and the allocation of the output buffer (step 806), which would otherwise be performed on the latter packet, are omitted. Thus, the delay time at the relay device is shortened.

Figure 23:
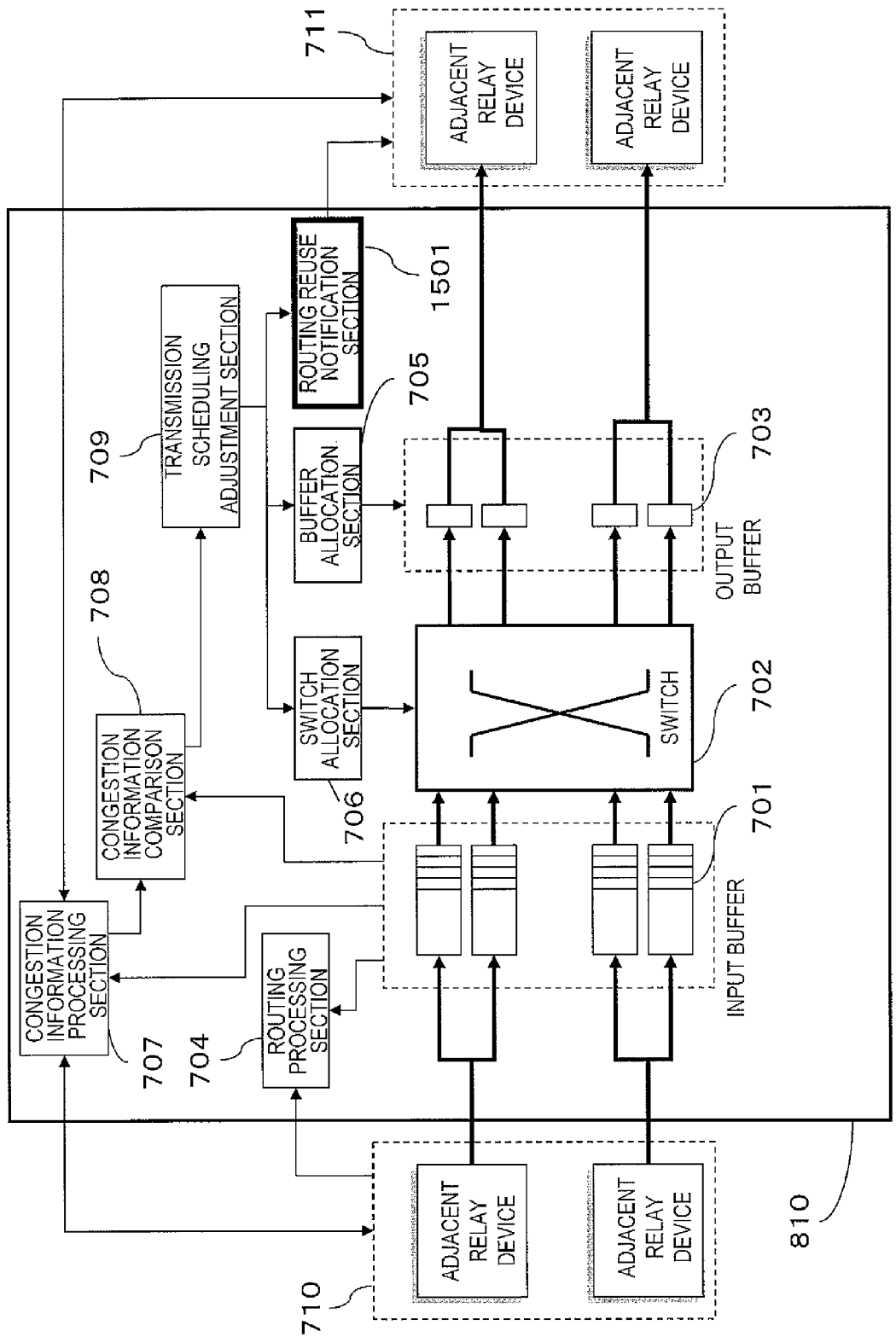
FIG. 23 is a structural view of a relay device 810 in Embodiment 3.

FIG. 23 is a structural view of a relay device 810 in this embodiment. Among the elements shown in FIG. 23, the same elements as those in FIG. 7 bear the same reference signs thereto and the description thereof will be omitted.

A routing reuse notification section 1501 is a processing section for, when packets having the same addressee are transmitted to the next relay device 711 via the same output buffer, notifying the next relay device 711 that the packets transmitted continuously are directed to the same addressee. It is assumed that packets transmitted to the next relay device 711 via the same output buffer are transmitted to the same input buffer of the next relay device 711.

Figure 24:
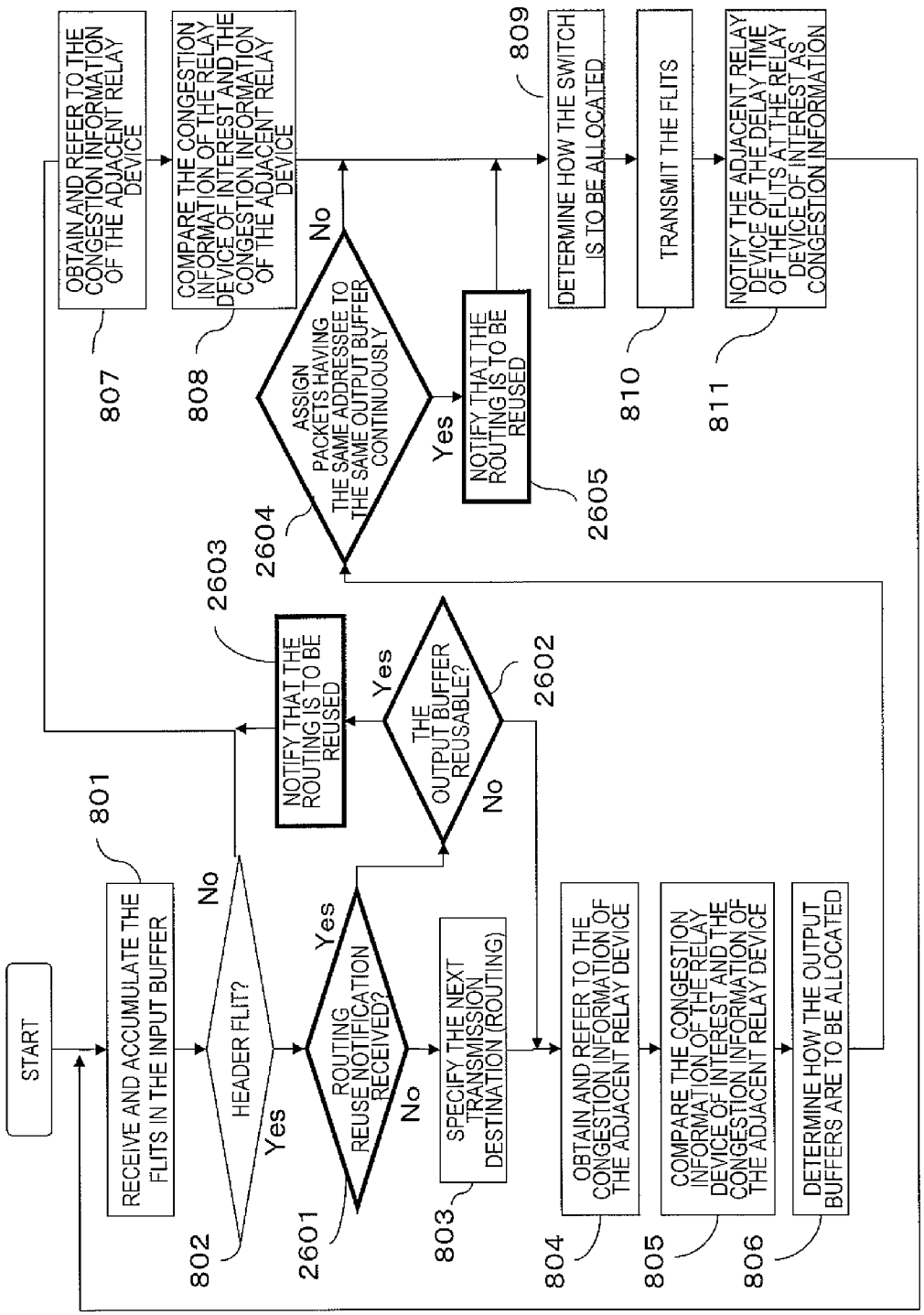
FIG. 24 shows an operation of the relay device 810 in Embodiment 3.

FIG. 24 shows an operation of the relay device 810 in this embodiment.

Substantially the same steps as those in FIG. 8 bear the same reference signs thereto and the descriptions thereof will be omitted.

When the packets transmitted continuously are directed to the same addressee, the routing reuse notification section 1501 in the relay device 810 transmits a notification instructing reuse of the routing processing to the next relay device 711. Hereinafter, processing performed by the relay device 810 including this processing will be described.

When a flit is transmitted from the adjacent relay device 710, the relay device 810 accumulates the flit in a prescribed input buffer among the input buffers 701 thereof (step 801).

When the received flit is a header flit in step 802, the routing processing section 704 checks whether or not a routing reuse notification has been received from the relay device 710 (step 2601).

When there is no routing reuse notification, the next receiving end needs to be specified. Thus, the routing processing section 704 performs the routing processing (step 803).

By contrast, when there is a routing reuse notification, the routing processing section 704 omits the routing processing and determines whether or not the result of the routing processing used for transmitting the immediately previous packet can be used, namely, whether or not the output buffer can be reused (step 2602).

When the input buffer which received the reuse notification can be continuously used and the output buffer used for transmitting the immediately previous packet is not allocated to another input buffer as a result of a request therefrom, the buffer allocation section 705 determines that the output buffer is reusable. In this case, the buffer allocation section 705 omits determining the allocation of the output buffer (step 806) and reuses the output buffer used for transmitting the immediately previous packet. The routing reuse notification section 1501 notifies the next relay device 711 that the routing is to be reused (step 2603).

When the output buffer used for transmitting the immediately previous packet cannot be continuously used, the processing advances to step 804 and the buffer allocation section 705 determines again the output buffer to be used.

When the buffer allocation section 705 allocates an output buffer to the input buffer in step 806, the routing reuse notification section 1501 determines whether or not the addressee of the packet in the input buffer is the same as the addressee of the immediately previous packet (step 2604). When the packets having the same addressee are continuously allocated to the same output buffer, the routing reuse notification section 1501 notifies the next relay device that the routing processing is not necessary (step 2605).

As described above, the relay device 810 in this embodiment determines whether or not the routing can be reused by means of the routing reuse notification section 1501. When the routing can be reused, the routing reuse notification section 1501 notifies the next relay device 711 that the routing can be reused. Thus, the routing processing (step 803) and the allocation of the output buffer (step 806), which would otherwise be performed by the next relay device 711, are omitted. Owing to this, the delay time at the relay device can be shortened.

When allocating an output buffer to each input buffer, the buffer allocation section 705 may allocates packets having the same addressee to the same output buffer continuously, based on the congestion information.

For example, when the number of input and output buffers is smaller than the number of traffics passing the relay device, the traffics need to use the input and output buffers in turns. Therefore, the same input and output buffers are allocated only to a traffic having a low congestion level with priority, so that the packets having the same addressee are continuously transmitted to the next relay device via the same output buffer. Owing to this, the delay time of the traffic having the low congestion level can be further shortened.

By additionally having the above-described structure and additionally performing the above-described processing, the relay device 810 in this embodiment can omit the routing processing and the processing for allocating the output buffer which would otherwise be performed on a traffic having a low congestion level. Therefore, the reduction of the transmission performance of the entire circuit can be suppressed.

In this embodiment, the traffics having a low congestion level are allocated the same output buffer with priority as an example. Alternatively, oppositely, traffics having a high congestion level may be allocated the same output buffer with priority to shorten the delay time of such traffics. Owing to this also, the transmission delay can be shortened.

In this embodiment, the routing processing is omitted by a routing reuse notification. Calculation processing for the routing processing, and determination on whether or not the routing can be reused, each require at least one cycle. Since the relay device which has received a traffic does not perform the routing, the processing time can be shortened.

The "determination processing" on the routing reuse notification may be performed in parallel to, for example, the "determination processing" on the header flit. Therefore, the determination processing on the routing reuse notification does not extend the processing time.

Accordingly, by the result of the routing performed by the previous-stage relay device being conveyed to the next relay device sequentially so as to omit the same processing, the processing time can be shortened.

Embodiment 4

In this embodiment, it is assumed that an operation clock of each of the decentralized buses is individually changed by a relay device. The operation clock of the bus on the route on which a traffic having a high congestion level flows is increased to transmit the flit faster than on the other buses. Thus, the transmission delay is suppressed.

Figure 25:
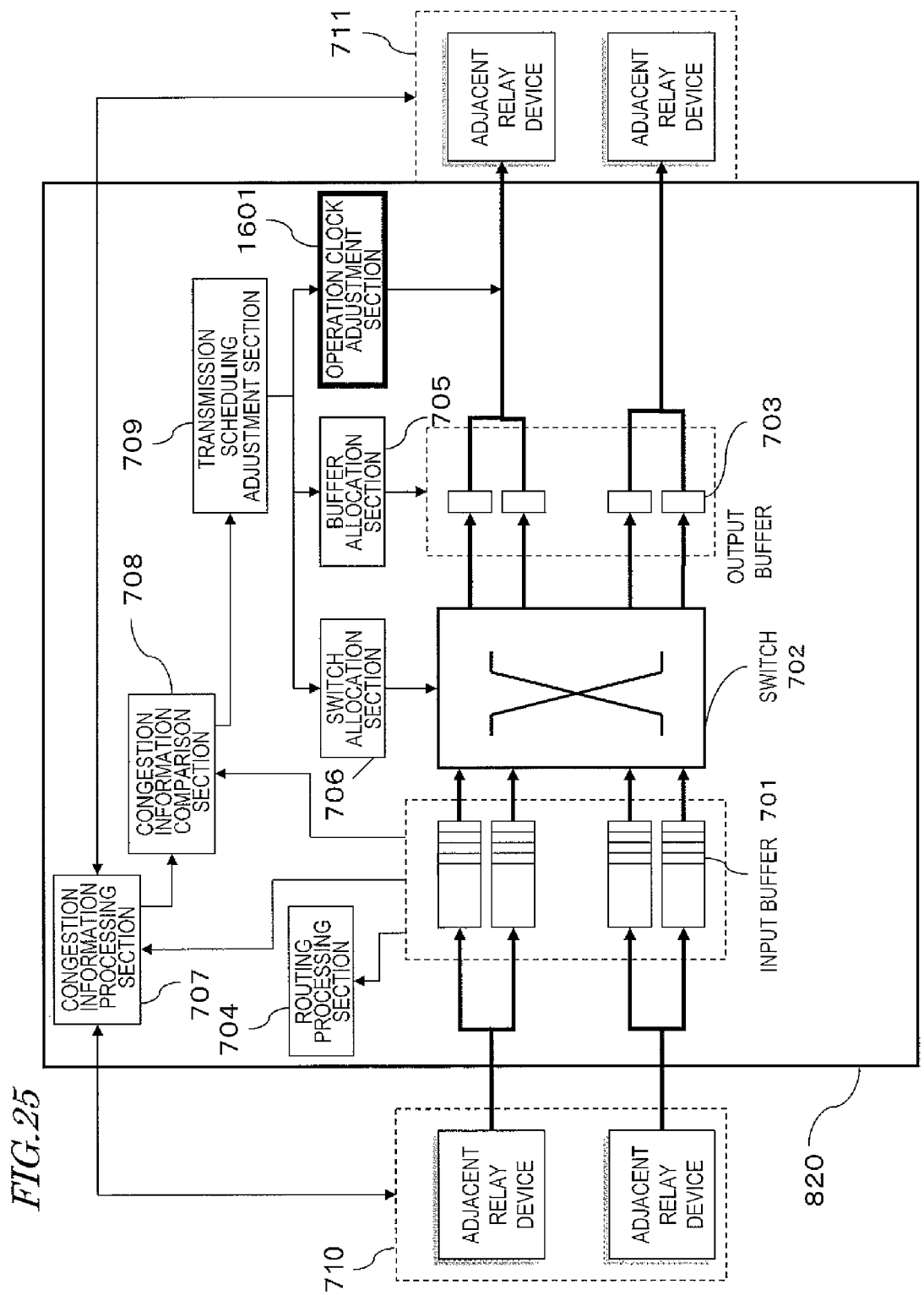
FIG. 25 is a structural view of a relay device 820 in Embodiment 4.

FIG. 25 is a structural view of a relay device 820 in this embodiment. Among the elements shown in FIG. 25, the same elements as those in FIG. 7 bear the same reference signs thereto and the description thereof will be omitted.

When the transmission scheduling adjustment section 709 detects a traffic having a high congestion level and a low priority degree, an operation clock adjustment section 1601 increases the operation clock of the bus on the traffic output side.

Figure 26:
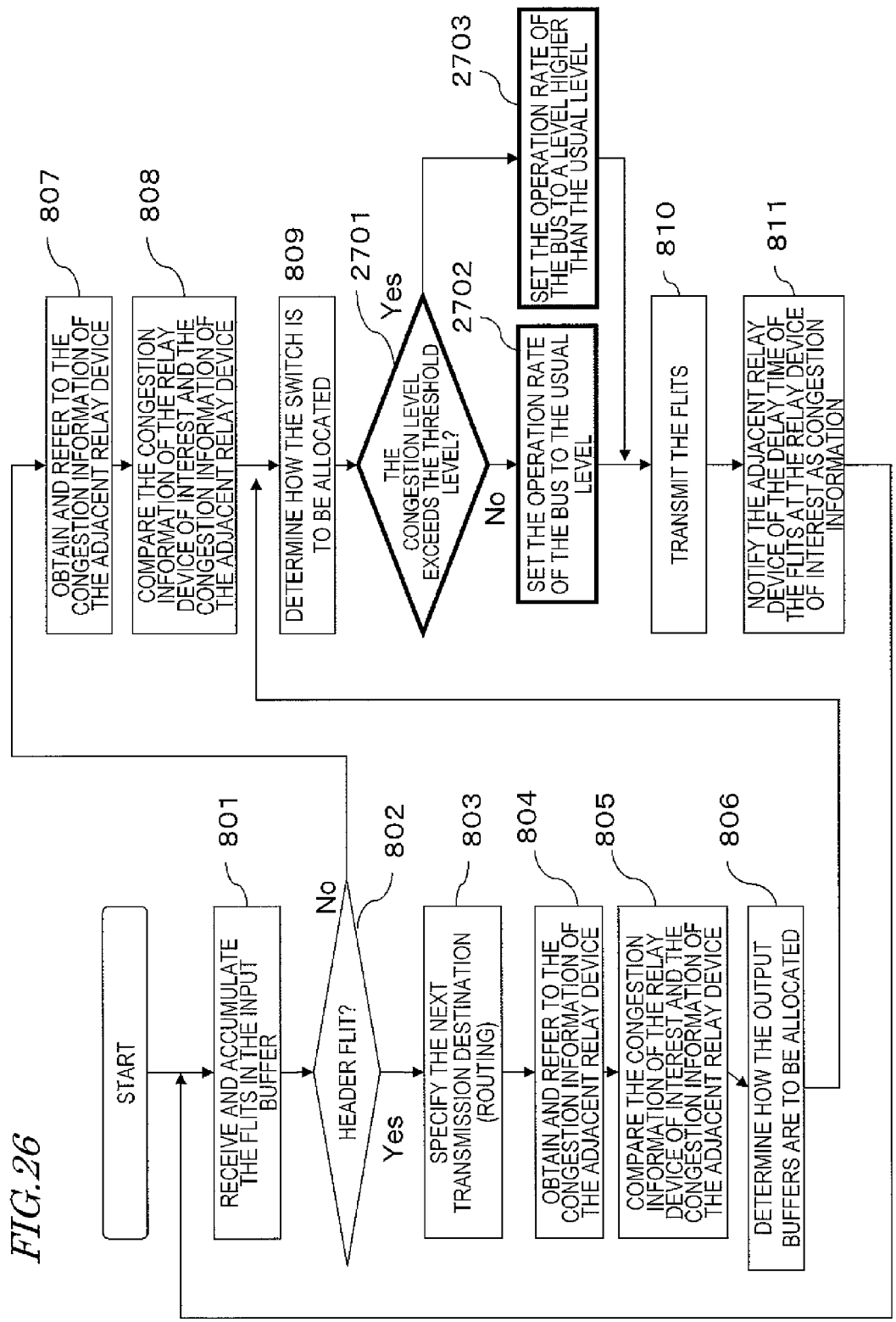
FIG. 26 shows an operation of the relay device 820 in Embodiment 4.

FIG. 26 shows an operation of the relay device 820 in this embodiment.

The same steps as those in FIG. 8 bear the same reference signs thereto and the descriptions thereof will be omitted.

When the switch allocation section 706 determines how the output buffers are allocated to the input buffers, the operation clock adjustment section 1601 determines whether or not the congestion level of each buffer exceeds a prescribed threshold level (step 2701).

When there is no input buffer having a congestion level exceeding the threshold level, the operation clock adjustment section 1601 sets the operation rate of the corresponding bus to a rate determined in advance with an assumption of usual use (step 2702).

When there is an input buffer having a congestion level exceeding the threshold level, the operation clock adjustment section 1601 sets the operation rate of the corresponding bus to a rate higher than the operation rate determined in advance with an assumption of usual use (step 2703).

By additionally having the above-described structure, the relay device 820 in this embodiment can transmit a traffic having a high congestion level to the next relay device quickly and thus shorten the delay time. Therefore, the reduction of the transmission performance of the entire circuit can be suppressed.

Embodiment 5

In Embodiments 1 through 4, relay devices adjacent to each other exchange a delay time of each traffic, compare the delay times to find the difficulty of flowing of each traffic on the route, and adjust the transmission scheduling of each traffic based on the value of the difficulty. Therefore, in each of Embodiment 1 through 4, the relay devices adjacent to each other associate with each other to control the transmission scheduling in cooperation.

In such transmission scheduling control realized by cooperation of the relay devices, when a delay time of a traffic at a certain relay device exceeds a prescribed threshold level, the following occurs. Even when it is attempted to suppress the extension of the delay time of this traffic, the transmission scheduling realized by the cooperation with the adjacent relay device is prioritized. As a result, the traffic is delayed in the certain relay device.

By contrast, in this embodiment, when the congestion level of a relay device is higher than the prescribed threshold level, the relay device does not perform transmission scheduling in cooperation with an adjacent relay device. Instead, the relay device performs selfish transmission scheduling so as to suppress the extension of the delay time at the relay device based only on the state of congestion in the relay device.

Figure 27:
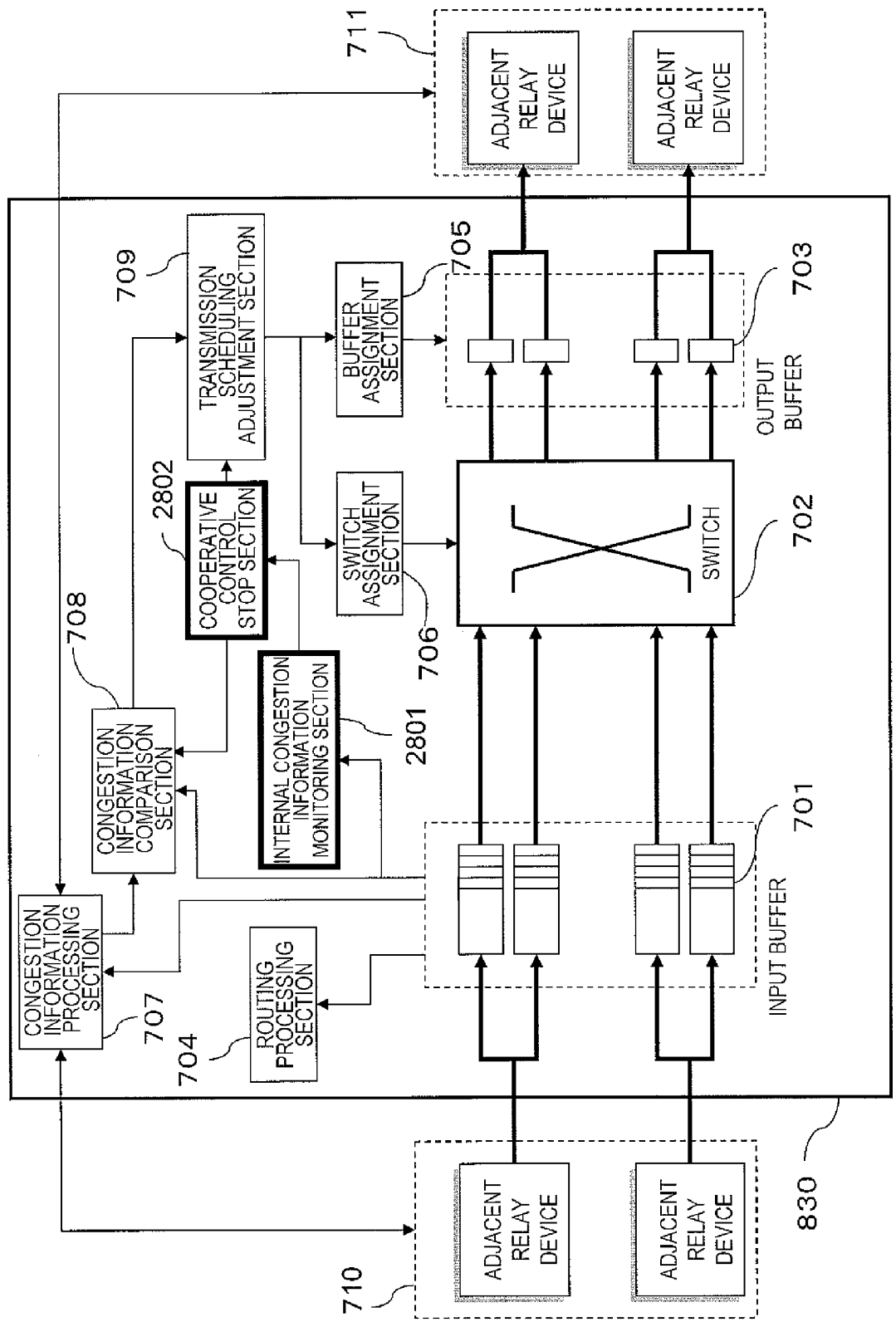
FIG. 27 is a structural view of a relay device 830 in Embodiment 5.

FIG. 27 is a structural view of a relay device 830 in this embodiment. Among the elements shown in FIG. 27, the same elements as those in FIG. 7 bear the same reference signs thereto and the description thereof will be omitted.

An internal congestion information monitoring section 2801 is a processing section for determining whether or not the delay time of a traffic at the relay device 830 exceeds a prescribed threshold level.

A cooperative control stop section 2802 is a processing section for, when the delay time of a traffic at the relay device 830 exceeds the prescribed threshold level, stopping the calculation of the congestion level performed by comparing such a delay time against the delay time at the adjacent relay device 711 and instead, specifying the congestion level based only on the delay time at the relay device 830.

Figure 28:
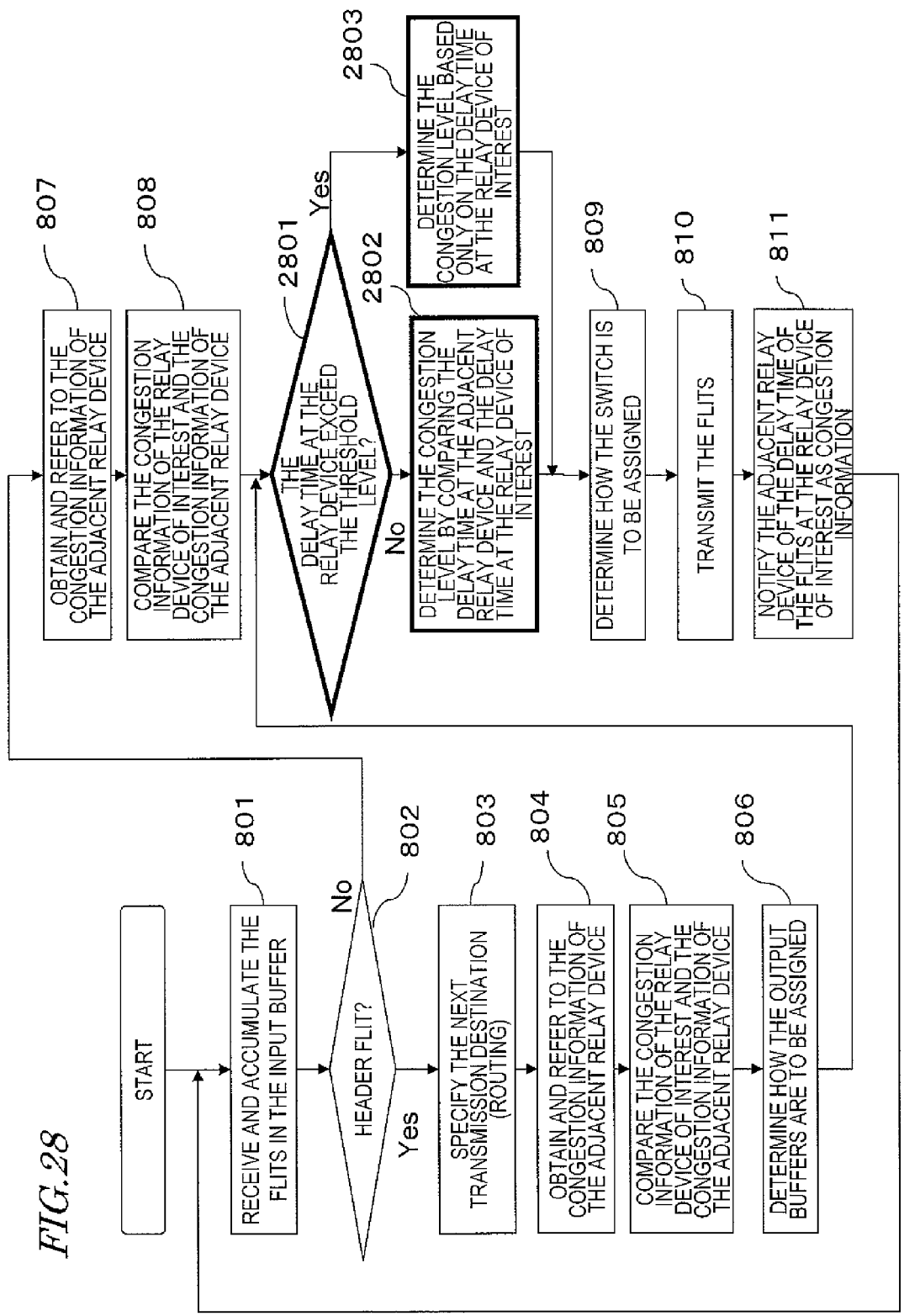
FIG. 28 shows an operation of the relay device 830 in Embodiment 5.

FIG. 28 shows an operation of the relay device 830 in this embodiment.

The same steps as those in FIG. 8 bear the same reference signs thereto and the descriptions thereof will be omitted.

The internal congestion information monitoring section 2801 in the relay device 830 determines whether or not the delay time at the input buffer in the relay device 830 exceeds a prescribed threshold level (step 2801).

When the delay time at the input buffer in the relay device 830 is equal to or less than the prescribed threshold level, the cooperative control stop section 2802 instructs the congestion information comparison section 708 to find the congestion level by comparing the delay time at the adjacent relay device 711 and the delay time at the relay device 830, and conveys the congestion level to the transmission scheduling adjustment section 709 (step 2802).

By contrast, when the delay time at the input buffer in the relay device 830 exceeds the prescribed threshold level, the cooperative control stop section 2802, instead of the congestion information comparison section 708, finds the congestion level by use only of the length of the delay at the relay device 830 and conveys the congestion level to the transmission scheduling adjustment section 709 (step 2803).

By additionally having the above-described structure, the relay device 830 in this embodiment, when the delay time at the relay device 830 exceeds the prescribed threshold level, can perform selfish transmission scheduling without conforming to the state of congestion in an adjacent relay device and thus can prioritize the reduction of the delay time at the relay device 830. Therefore, the reduction of the transmission performance of the entire circuit can be suppressed and also the local reduction of the transmission performance can be suppressed.

Embodiment 6

In Embodiment 6, processing performed by a relay device of a line switching system for adjusting the transmission scheduling will be described.

Figure 29A:
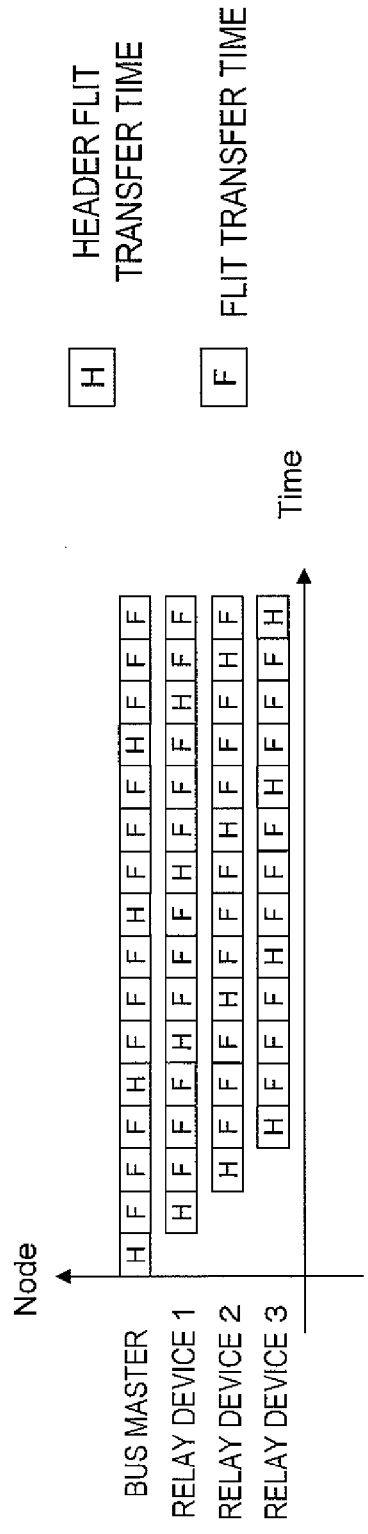
FIG. 29A shows a packet switching system.
Figure 29B:
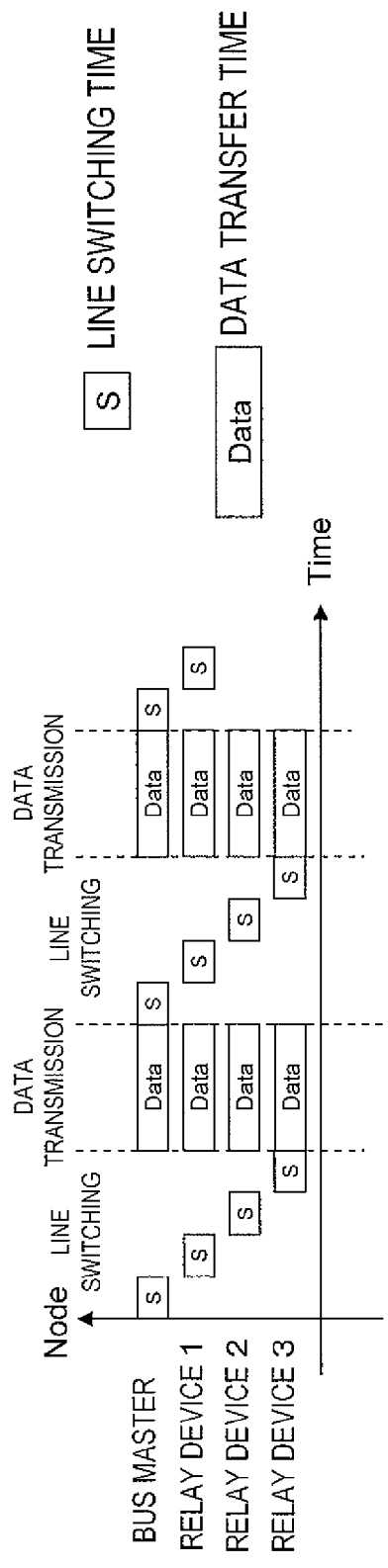
FIG. 29B shows a line switching system.

FIG. 29A shows a packet switching system. FIG. 29B shows a line switching system. According to FIGS. 29A and 29B, it can be seen a difference between the packet switching system and the line switching system.

The diagrams depicted in FIGS. 29A and 29B each show how the data flows in the respective switching system. The vertical axis of each graph represents the position of the data, and the horizontal axis of each graph represents the time flow.

As shown in FIG. 29A, according to the packet switching system, a traffic is transmitted from the bus master to the relay devices sequentially in units of a flit.

As shown in FIG. 29B, according to the line switching system, first, a signal for line switching is sent from the bus master to the addressee via the relay devices sequentially. This switches the line, and then data is transmitted.

Figure 30:
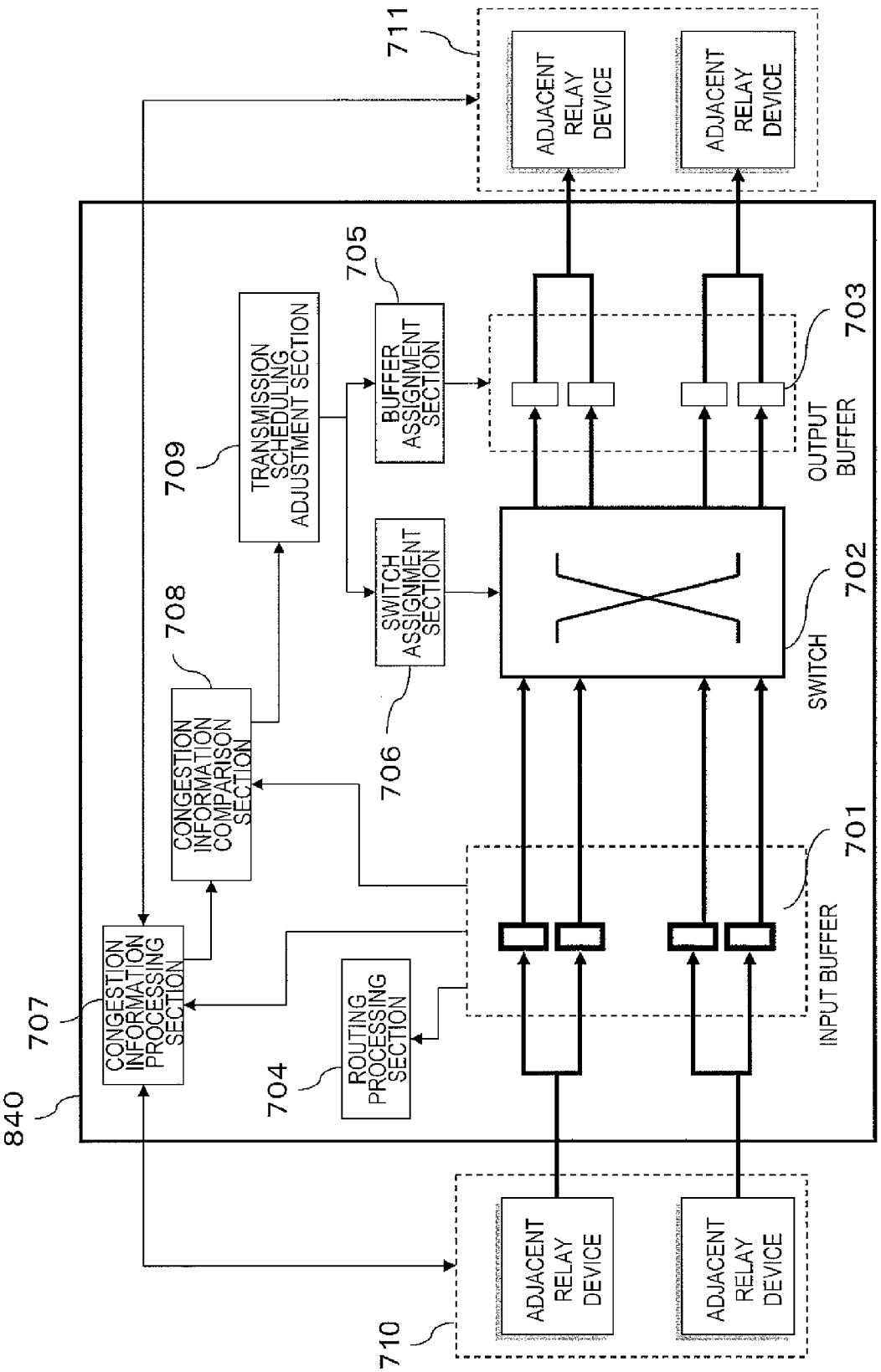
FIG. 30 shows a structure of a relay device 840 of the line switching system in Embodiment 6.

FIG. 30 shows a structure of a relay device 840 of the line switching system in this embodiment. As shown in FIG. 30, in the relay device 840, each of the input buffers 701 merely needs to have a size for one flit for accumulating a switching signal. Except for this, the structure of the relay device 840 is the same as the structure of the relay device of the packet switching system shown in FIG. 7, and so the description thereof will be omitted.

With the line switching system, after the line is secured, no interference occurs among the traffics. Therefore, the transmission scheduling only needs to be adjusted for a line switching signal before the data is transmitted. This adjustment can be made by substantially the same method as that for the header flit of the packet switching system.

The embodiments of the present invention have been described. In this specification, the elements of each relay device in each embodiment are assumed to be realized by hardware. The hardware may be provided as each element or provided as a circuit including a plurality of elements. Since the elements are realized by hardware, each relay device can perform the processing at a high speed and thus can minimize the internal processing delay. One or more of the elements may be realized by software, namely, the function of one or more of the elements may be provided by software executed by a microcontroller, as long as the processing can be performed at such a high speed that the internal processing delay does not cause any problem.

A relay device according to the present invention can suppress the increase of the delay or jitter caused by interference among a plurality of traffics in an integrated circuit including decentralized buses. Therefore, the relay device according to the present invention is useful for controlling decentralized buses in an SoC (System on Chip) or the like in which a plurality of traffics are transmitted in real time for medium processing or the like.

The relay device according to the present invention is also useful for power savings of an integrated circuit because the extension of the delay time is suppressed and so the processing time is shortened.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A relay device for, in an integrated circuit including decentralized buses, connecting a plurality of buses, the relay device comprising:

a switch for switching a combination of an input for receiving traffic data and an output for sending the traffic data;

a congestion information processing section for obtaining adjacent congestion information indicating a degree of congestion of each of a plurality of traffics from an adjacent relay device, which handles the plurality of traffics commonly with the relay device, and self congestion information of each traffic in the relay device;

a congestion information comparison section for finding information on a congestion level which quantitatively indicates difficulty of flowing of each traffic on a transmission route from the relay device to the adjacent relay device based on the adjacent congestion information obtained from the adjacent relay device and the self congestion information of the relay device;

a transmission scheduling adjustment section for assigning a transmission band of a bus to each traffic based on the congestion level to adjust transmission scheduling from the relay device to the adjacent relay device; and a switch allocation section for shifting the switch based on a result of the transmission band of the bus assigned by the transmission scheduling adjustment section.

2. The relay device of claim 1, wherein:
the self congestion information indicates a delay time required by traffic data of each traffic to pass the relay device and the adjacent congestion information indicates a delay time required by traffic data of each traffic to pass the adjacent relay device; and
the congestion information comparison section finds information on the congestion level which quantitatively indicates the difficulty of flowing of each traffic on the transmission route based on the delay time of each traffic obtained from the adjacent relay device and the delay time of each traffic at the relay device.

3. The relay device of claim 1, wherein:
the congestion level is a numerical value which indicates the difficulty of flowing of each traffic on the transmission route, and is lower as the traffic flows more easily and is higher as the traffic has more difficulty flowing;
the transmission scheduling adjustment section assigns the transmission band of the bus to a traffic having lower congestion levels relative to the congestion level of each traffic with higher priority; and
the transmission scheduling adjustment section assigns the transmission band of the bus to a traffic having higher congestion levels relative to the congestion level of each traffic with lower priority.

4. The relay device of claim 3, wherein the transmission scheduling adjustment section assigns the transmission band of the bus to the traffic having the lower congestion levels relative to the congestion level of each traffic with higher priority by securing a wider part of the transmission band of the bus for the traffic with the lower congestion levels than a part of the transmission band of the bus secured for the traffic with higher congestion levels, by allowing the traffic with the lower congestion levels to use the transmission band of the bus earlier than the traffic with the higher congestion levels, or by securing a longer time in which the traffic with the lower congestion levels can use the transmission band of the bus than the time in which the traffic with the higher congestion levels can use the transmission band of the bus.

5. The relay device of claim 1, wherein:
the traffic data of each traffic is transmitted on the buses as being divided into packets; and
the relay device further includes:
a packet disposal section for disposing of a packet of a traffic, having a congestion level higher than a prescribed threshold level, from the input buffer; and
a re-transmission request section for requesting a buffer which is a transmitting end of the disposed packet to re-transmit the packet.

6. The relay device of claim 1, wherein:
the traffic data of each traffic is transmitted on the buses as being divided into packets; and
the relay device further includes:
a plurality of output buffers respectively connected to a plurality of outputs for sending data to different buses; and
a routing reuse notification section for allocating an identical output buffer to continuous packets of a traffic having a congestion level higher than a prescribed threshold level, and notifying the adjacent relay device to which the traffic is to be transmitted that routing setting is to be reused.

7. The relay device of claim 1, wherein:
an operation clock of each of the buses is changeable; and
the relay device further includes an operation clock control section for increasing an operation clock of the bus connected to the output when a traffic having a congestion level higher than a prescribed threshold level is to be transmitted.

8. The relay device of claim 2, further comprising a cooperative control stop section for determining a self congestion level based only on the delay time required by the traffic data to pass the relay device;
wherein when the delay time not exceeding a prescribed threshold level occurs at the relay device, the congestion information comparison section determines the congestion level based on the delay time required by the traffic data to pass the adjacent relay device and the delay time required by the traffic data to pass the relay device,
when a delay time exceeding the prescribed threshold level occurs at the relay device, the cooperative control stop section determines the self congestion level based only on the delay time required by the traffic data to pass the relay device.

9. A relay device for, in an integrated circuit including decentralized buses, connecting a plurality of buses, the relay device comprising:
a switch for switching a combination of an input for receiving traffic data and an output for sending the traffic data;
a congestion information processing section for obtaining adjacent congestion information indicating a degree of congestion of each of a plurality of traffics from an adjacent relay device which handles the plurality of traffics commonly with the relay device, and self congestion information of each traffic in the relay device;
a congestion information comparison section for finding information on a congestion level which quantitatively indicates difficulty of flowing of each traffic on a transmission route from the relay device to the adjacent relay device based on the adjacent congestion information obtained from the adjacent relay device and the self congestion information of the relay device;
a transmission scheduling adjustment section for, where the congestion level of each traffic is a congestion level of an input buffer accumulating traffic data of the traffic, determining a value of weight of an output buffer accumulating the traffic data in accordance with the congestion level of the input buffer and assigning a transmission band of a bus for each traffic in accordance with the determined value of weight to adjust transmission scheduling from the relay device to the adjacent relay device; and
a switch allocation section for shifting the switch based on a result of the transmission band of the bus assigned by the transmission scheduling adjustment section.

10. The relay device of claim 9, wherein the transmission scheduling adjustment section connects the switch to the input buffer which received a transmission request at a probability in accordance with the value of weight given to each output buffer.

11. The relay device of claim 9, wherein the transmission scheduling adjustment section divides the transmission band by time into a plurality of time slots and assigns the time slots of a number specified in accordance with the value of weight to each of the output buffers.

12. The relay device of claim 9, wherein the transmission scheduling adjustment section stochastically selects an output buffer at a ratio specified in advance in accordance with the value of weight.

* * * * *